US009191994B2

(12) United States Patent
Royz et al.

(10) Patent No.: US 9,191,994 B2
(45) Date of Patent: Nov. 17, 2015

(54) APPARATUS, SYSTEMS, METHODS, AND COMPUTER PRODUCTS SUITABLE FOR USE IN AN ADVANCED DIGITAL BASEBAND PROCESSOR

(71) Applicant: Telefonaktiebolaget L M Ericsson (publ), Stockholm (SE)

(72) Inventors: Mikhail Royz, Ottawa (CA); Carl Cao, San Jose, CA (US); Pulin Chhatbar, Plano, TX (US); Fang Gao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 150 days.

(21) Appl. No.: 13/756,666

(22) Filed: Feb. 1, 2013

(65) Prior Publication Data

US 2013/0208671 A1 Aug. 15, 2013

Related U.S. Application Data

(60) Provisional application No. 61/594,470, filed on Feb. 3, 2012.

(51) Int. Cl.
*H04W 88/10* (2009.01)
*H04L 25/00* (2006.01)

(52) U.S. Cl.
CPC .............. *H04W 88/10* (2013.01); *H04L 25/00* (2013.01)

(58) Field of Classification Search
USPC ........ 370/329, 328, 310, 310.2, 338; 455/561
See application file for complete search history.

(56) References Cited

U.S. PATENT DOCUMENTS

| 8,457,142 | B1* | 6/2013 | Goldman et al. | ............ 370/408 |
| 2007/0191007 | A1* | 8/2007 | Hayek et al. | ............ 455/435.2 |
| 2009/0225689 | A1* | 9/2009 | Yu | ............ 370/310.2 |
| 2010/0173667 | A1* | 7/2010 | Hui et al. | ............ 455/552.1 |
| 2012/0243538 | A1* | 9/2012 | Zeffer et al. | ............ 370/392 |
| 2012/0275301 | A1* | 11/2012 | Xiong | ............ 370/230 |
| 2013/0070688 | A1* | 3/2013 | Picker | ............ 370/329 |
| 2013/0188502 | A1* | 7/2013 | Yang et al. | ............ 370/252 |

OTHER PUBLICATIONS

Konig et al, Reconfigurable Base station Processing and Resource Allocation, Jul. 1-5, 2007, IEEE, Mobile and Wireless Communications Summit, 2007. 16th IST, pp. 1-5.*

(Continued)

*Primary Examiner* — Habte Mered
*Assistant Examiner* — Rownak Islam
(74) *Attorney, Agent, or Firm* — Withrow & Terranova, PLLC

(57) ABSTRACT

The present disclosure relates to an advanced digital baseband processor for a base station in a cellular communications network. In general, the advanced digital baseband processor integrates multiple Radio Access Technologies (RATs). As used herein, a RAT is a radio access technology as defined by a corresponding standard. For example, in one embodiment, RATs integrated by the advanced digital baseband processor include a Code Division Multiple Access (CDMA) voice RAT (e.g., 3GPP2 CDMA 1xRTT or 3GPP2 CDMA 1xAdvanced) as well as a CDMA Data Only, or Data Optimized, (DO) RAT (e.g., 3GPP2 CDMA EV-DO or 3GPP2 CDMA EV-DO Rev B). In another embodiment, the RATs integrated by the advanced digital baseband processor also include 3GPP Long Term Evolution (LTE). The RATs given above are only examples. The advanced digital baseband processor may integrate additional or alternative RATs.

18 Claims, 16 Drawing Sheets

(56) References Cited

OTHER PUBLICATIONS

Written Opinion for PCT/IB2013/050875, mailed Feb. 13, 2014, 8 pages.
International Preliminary Report on Patentability for PCT/IB2013/050875 mailed May 27, 2014, 13 pages.
Greenstreet, Debbie, "Enabling Multistandard Wireless Base Stations with TI's KeyStone SoCs," Texas Instruments White Paper, Feb. 2011, 9 pages.
Hoffman, Jeff et al., "Architecture of the Scalable Communications Core," Proceedings of the First International Symposium on Networks-on-Chip (NOCS'07), Copyright: 2007, 10 pages.
Author Unknown, "Multicore Axxia Communication Processor (ACP): Overview," LSI—Product Brief, Feb. 2010, 2 pages.
Author Unknown, "TMS320TCI6618: Doubling Performance for 4G Wireless Base Stations," Texas Instruments Product Bulletin, Copyright: 2011, 5 pages.
International Search Report and Written Opinion for PCT/IB2013/050875, mailed Jun. 27, 2013, 14 pages.

* cited by examiner

APPARATUS, SYSTEMS, METHODS, AND COMPUTER PRODUCTS SUITABLE FOR USE IN AN ADVANCED DIGITAL BASEBAND PROCESSOR

RELATED APPLICATIONS

This application claims the benefit of provisional patent application Ser. No. 61/594,470, filed Feb. 3, 2012, the disclosure of which is hereby incorporated herein by reference in its entirety.

FIELD OF THE DISCLOSURE

The present disclosure relates to integration of multiple Radio Access Technologies (RATs) into a single advanced digital baseband processor.

BACKGROUND

Multiple-standard base stations have become a major trend in cellular communications networks. A multiple-standard base station is a base station that supports multiple Radio Access Technologies (RATs). A multiple-standard base station includes a digital baseband unit that supports multiple RATs and one or more radio units that wirelessly transmit and receive signals. Currently, the digital baseband unit for a multiple-standard base station includes separate resources for each of the RATs. More specifically, as illustrated in FIG. 1, a conventional digital baseband unit 10 for a multiple-standard base station includes separate cards, or circuit boards, for each of the RATs. Specifically, the conventional digital baseband unit 10 of FIG. 1 supports $3^{rd}$ Generation Partnership Project 2 (3GPP2) 1x Radio Transmission Technology (RTT) for voice and 3GPP2 Evolution-Data Optimized (EV-DO) for data, where 3GPP2 1xRTT and 3GPP2 EV-DO are defined by separate Code Division Multiple Access (CDMA) standards and are separate RATs. The conventional digital baseband unit 10 includes a Control Module (CM) card 12-1 and a 1x card 12-2 that together support 3GPP2 1xRTT as well as a Data Only (DO) card 12-3 that supports 3GPP2 EV-DO. Each of the cards 12-1 through 12-3 has its own processing resources (e.g., Central Processing Unit (CPU) or Application Specific Integrated Circuit (ASIC)), its own memory resources, etc.

A primary concern for multiple-standard base stations is cost. Particularly for mature RATs such as CDMA RATs, the cards that support the RATs have been designed and redesigned to reduce cost and are now reaching the point where further reduction in cost is difficult to obtain. As such, there is a need for a new, or advanced, digital baseband unit that supports multiple RATs and significantly reduces the cost of the digital baseband unit and thus the cost of the multiple-standard base station.

SUMMARY

The present disclosure relates to an advanced digital baseband processor for a base station in a cellular communications network. In general, the advanced digital baseband processor integrates multiple Radio Access Technologies (RATs). As used herein, a RAT is a radio access technology as defined by a corresponding standard. For example, in one embodiment, RATs integrated by the advanced digital baseband processor include a Code Division Multiple Access (CDMA) voice RAT (e.g., $3^{rd}$ Generation Partnership Project 2 (3GPP2) CDMA 1x Radio Transmission Technology (RTT) or 3GPP2 CDMA 1xAdvanced) as well as a CDMA Data Only, or Data Optimized, (DO) RAT (e.g., 3GPP2 CDMA Evolution-Data Optimized (EV-DO) or 3GPP2 CDMA EV-DO Rev B). In another embodiment, the RATs integrated by the advanced digital baseband processor also include 3GPP Long Term Evolution (LTE). The RATs given above are only examples. The advanced digital baseband processor may integrate additional or alternative RATs.

In one embodiment, an apparatus for use in an advanced digital baseband processor that integrates multiple RATs includes shared processing resources that integrate the multiple RATs. In one embodiment, the apparatus includes a multi-core processor having multiple processor cores, and the shared processing resources that integrate the multiple RATs are at least a subset of the processor cores of the multi-core processor. More specifically, in one embodiment, the multi-core processor operates in an Asymmetric Multi-Processing (AMP) mode where each RAT integrated by the advanced digital baseband processor is supported by a different processor core. In one particular embodiment, the RATs integrated by the advanced digital baseband processor include a CDMA voice RAT (e.g., 3GPP2 CDMA 1xRTT or 3GPP2 CDMA 1xAdvanced) and a CDMA DO RAT (e.g., 3GPP2 CDMA EV-DO or 3GPP2 CDMA EV-DO Rev B), where the CDMA voice RAT is implemented by a Control Module (CM) and a voice Modem Processor (voice MP) and the CDMA DO RAT is implemented by a DO System Controller (DO SC) and a DO Modem Processor (DO MP). The CM is supported by a first processor core of the multi-core processor, the voice MP is supported by a second processor core of the multi-core processor, the DO SC is supported by a third processor core of the multi-core processor, and the DO MP is supported by a fourth processor core of the multi-core processor. In another particular embodiment, the multi-core processor operates in Symmetric Multi-Processing (SMP) mode where the processor cores of the multi-core processor support the RATs integrated by the advanced digital baseband processor in a distributed manner. In another embodiment, the shared processing resources are at least a subset of the processing resources of an Application Specific Integrated Circuit (ASIC).

In one embodiment, in addition to the shared processing resources, the apparatus for use in the advanced digital baseband processor includes shared network connectivity resources for the RATs. Still further, in one embodiment, the apparatus is integrated into the advanced digital baseband processor, and the advanced digital baseband processor further includes shared baseband transport resources for the RATs, shared physical resources for the RATs, shared supporting functions for the RATs, or any combination thereof. In one embodiment, the shared network connectivity resources include one or more shared network interfaces as well as Internet Protocol (IP) routing, Ethernet switching or routing, proprietary transport processing and routing, or any combination thereof. In one embodiment, the shared baseband transport resources include a shared multiplexer for baseband signals for the RATs, a shared demultiplexer for baseband signals for the RATs, and one or more shared baseband transport interfaces (e.g., High Speed Serial Link (HSSL), Common Packet Radio Interface (CPRI), or a derived variant of HSSL or CPRI) to the one or more radio units of the base station. In one embodiment, the shared physical resources include a power supply, a battery pack, a Global Positioning System (GPS) receiver, a real-time clock, or any combination thereof. In one embodiment, the shared supporting functions include a shared cabinet shelf, a shared fan and filter, or both.

In one embodiment, the apparatus includes a single Operations, Administration, and Maintenance (OAM) architecture for all of the RATs. In one embodiment, the apparatus includes a multi-core processor having multiple processor cores, shared processing resources that support the multiple RATs are at least a subset of the processor cores of the multi-core processor, and one of the processor cores of the multi-core processor is dedicated for OAM.

In one embodiment, an apparatus for use in an advanced digital baseband processor that integrates multiple RATs includes a multi-core processor having multiple processor cores, wherein at least a subset of the processor cores integrate the multiple RATs. Preferably, the multi-core processor operates in an AMP mode where each RAT is supported by one or more different processor cores of the multi-core processor. For example, in one particular embodiment, the RATs integrated by the advanced digital baseband processor include a CDMA voice RAT (e.g., 3GPP2 CDMA 1xRTT or 3GPP2 CDMA 1xAdvanced) and a CDMA DO RAT (e.g., 3GPP2 CDMA EV-DO or 3GPP2 CDMA EV-DO Rev B), where the CDMA voice RAT is implemented by a CM supported by a first processor core and a voice MP supported by a second processor core and the CDMA DO RAT is implemented by a DO SC supported by a third processor core and a DO MP supported by a fourth processor core. The multi-core processor further includes a Network Processing Unit (NPU) that operates to provide packet routing for backhaul communications as well as inter-core communications. In addition, in one embodiment, the NPU provides flow control.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 6:
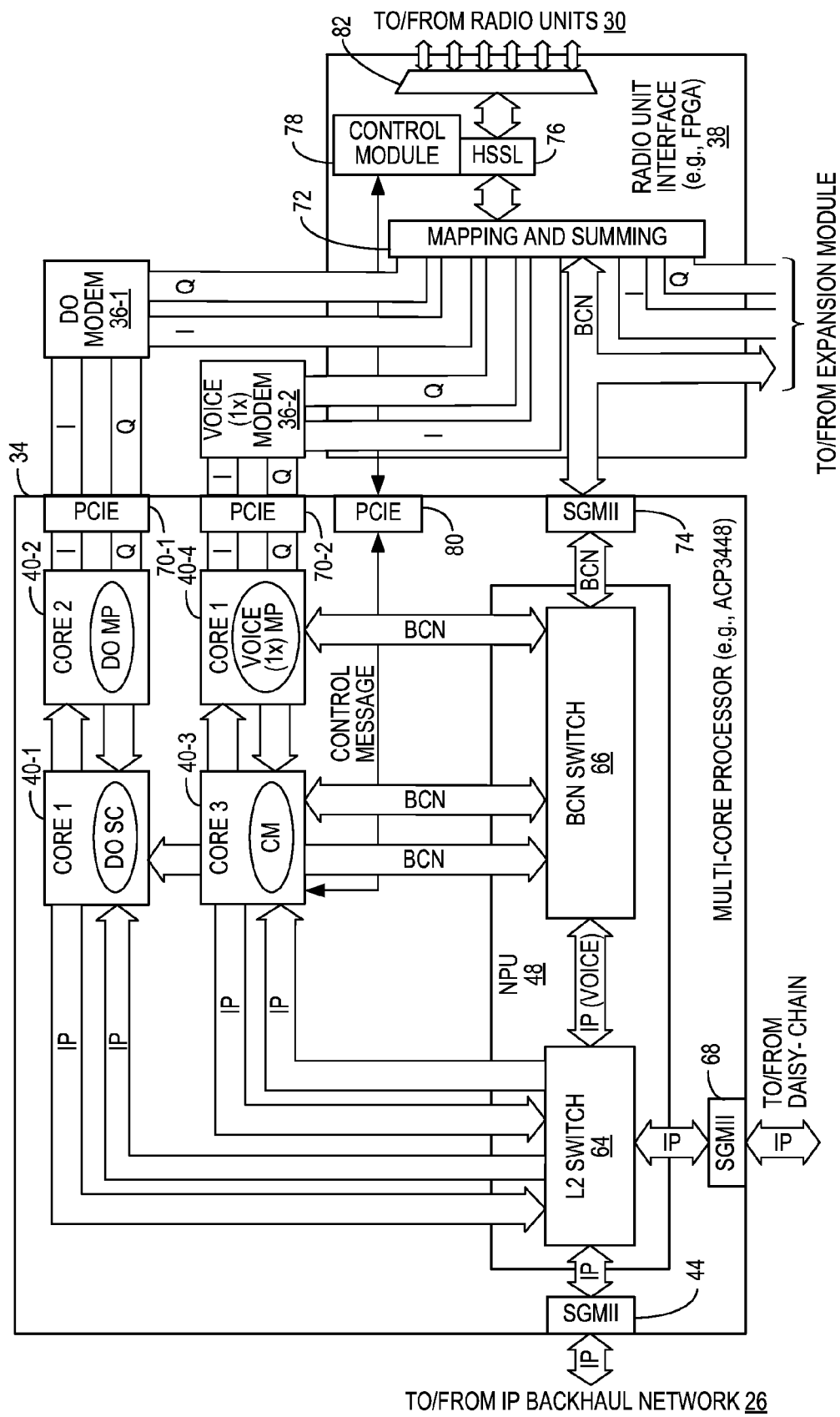
FIG. 6 is a more detailed illustration of the advanced digital baseband processor of FIG. 5 according to one embodiment of the present disclosure.
Figure 9:
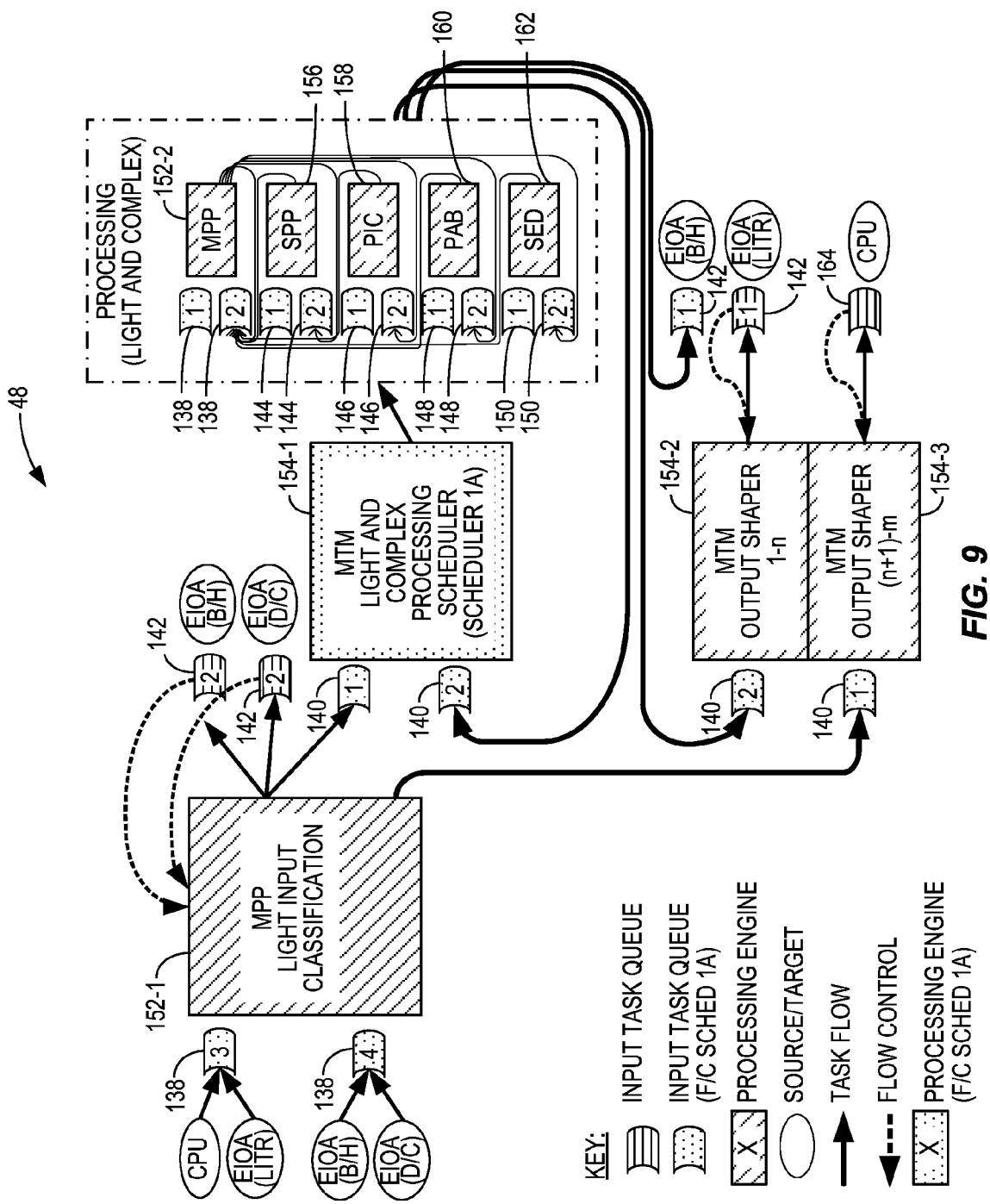
Figure 10:
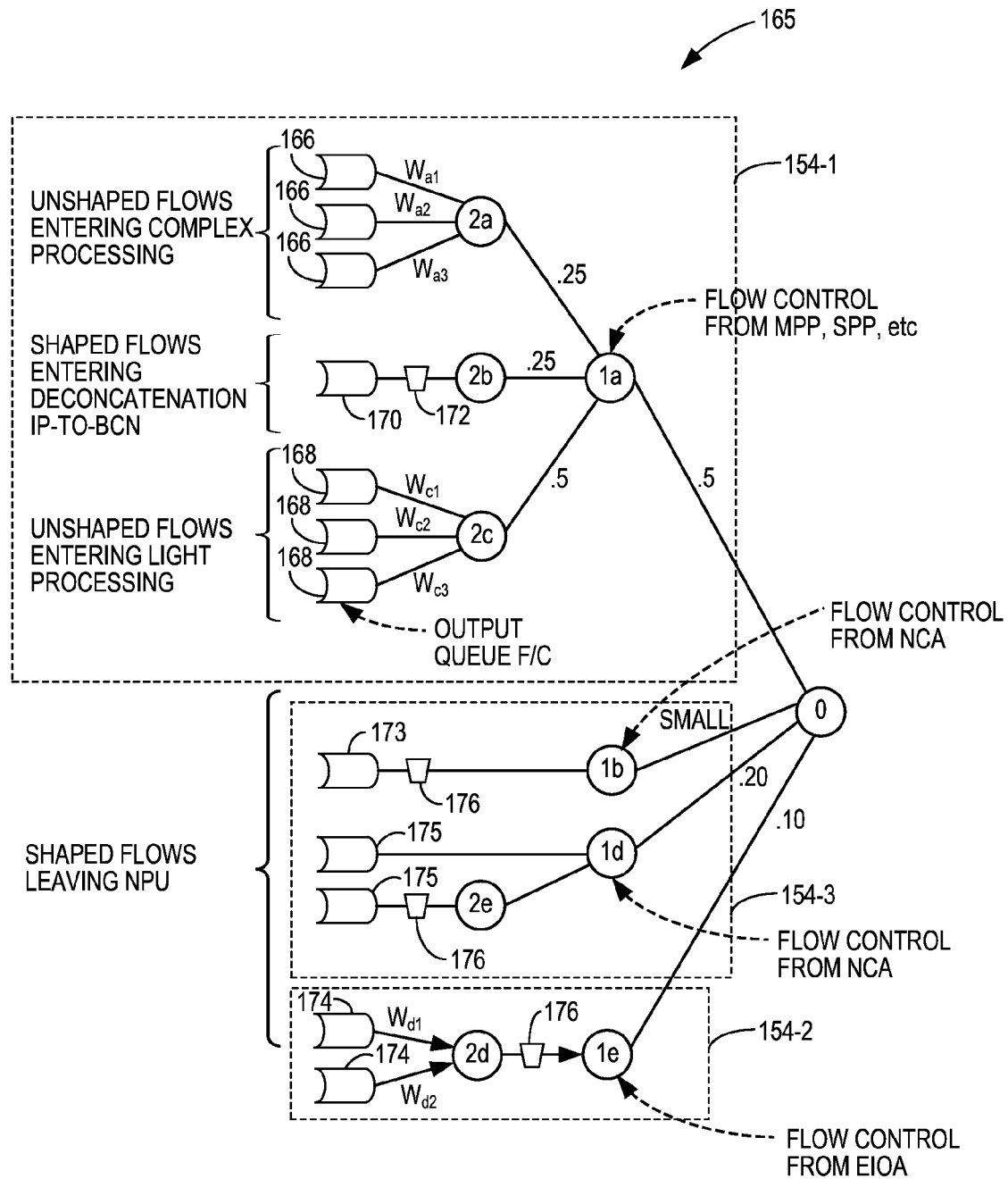
Figure 11:
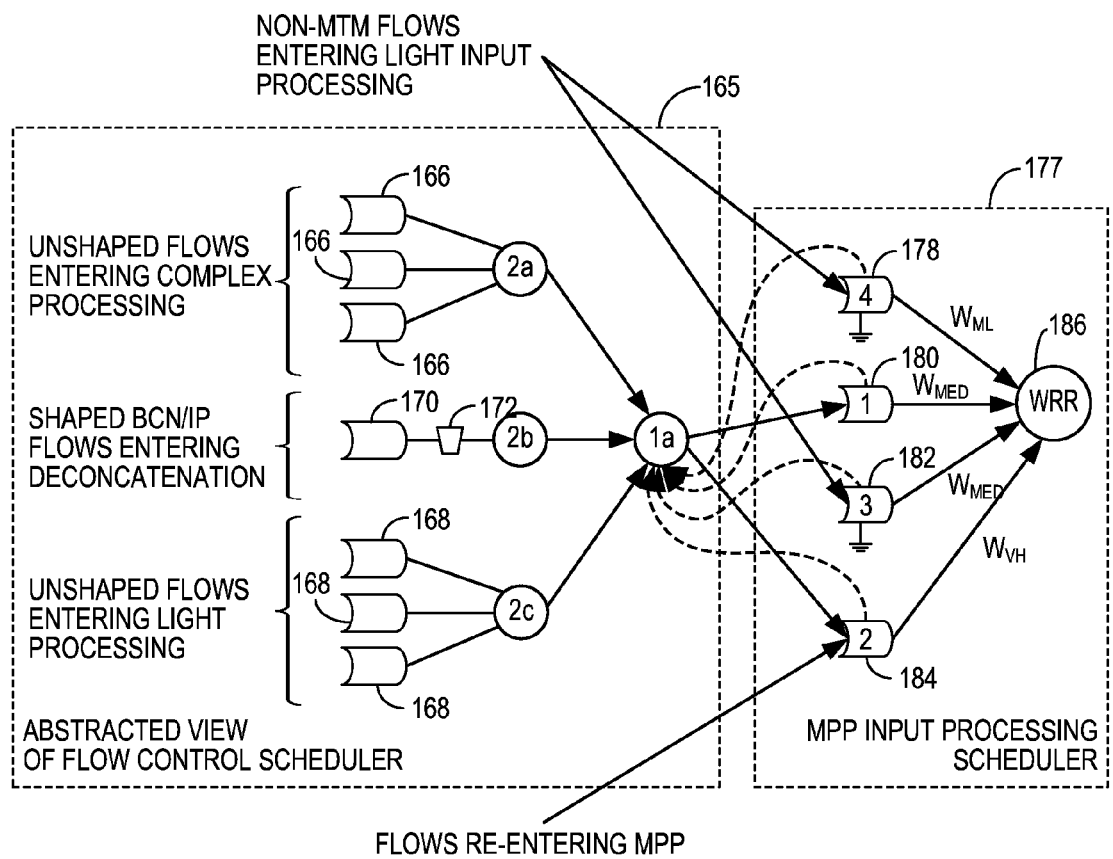
Figure 12:
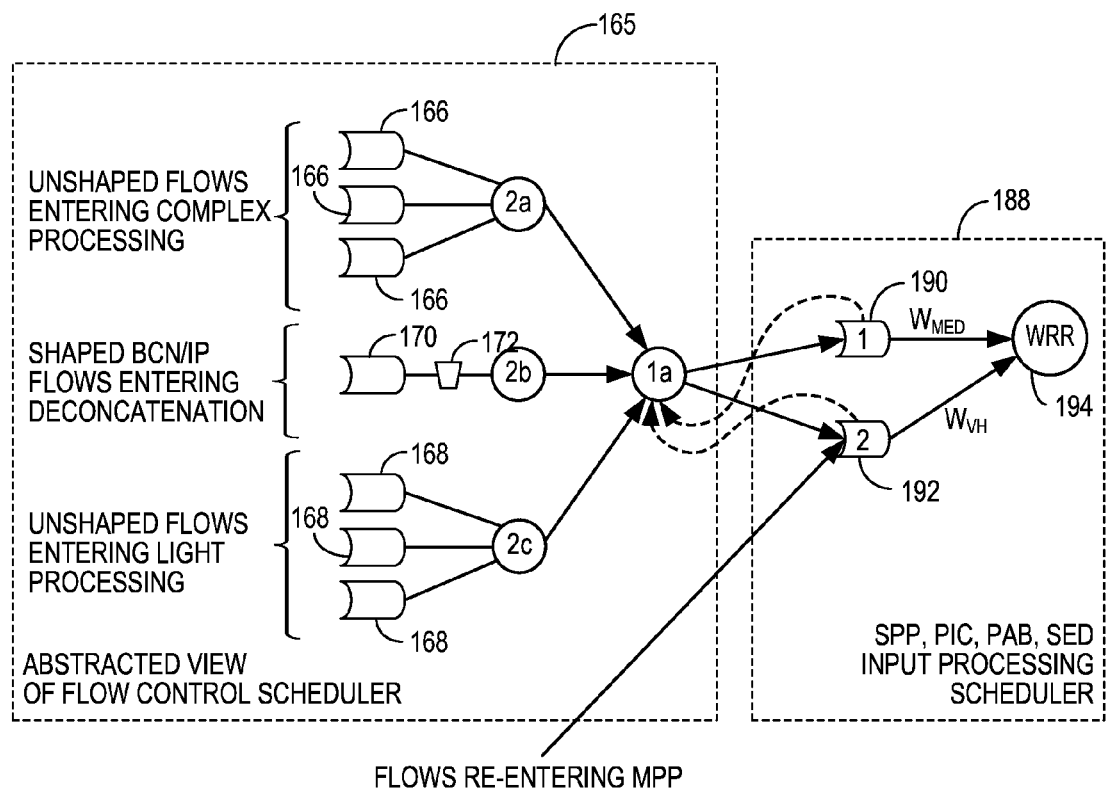
Figure 13:
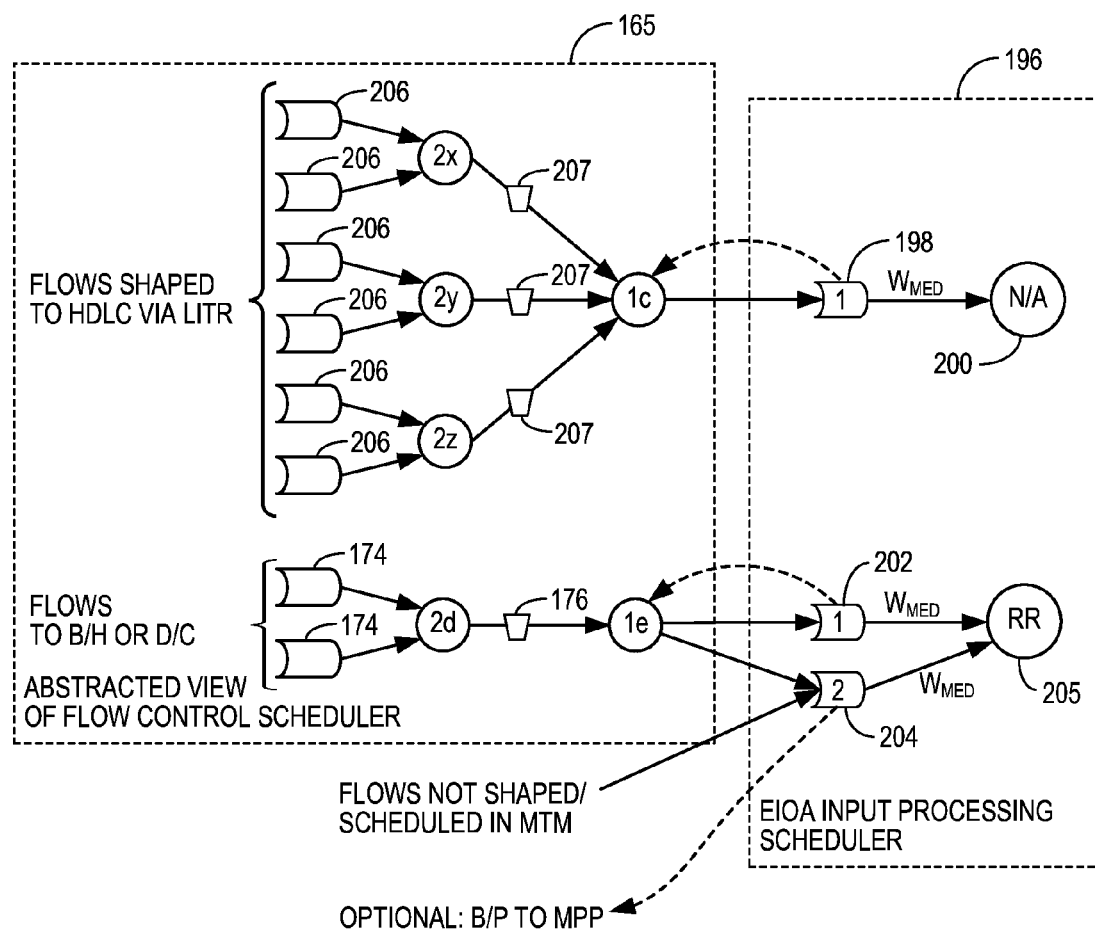
Figure 14:
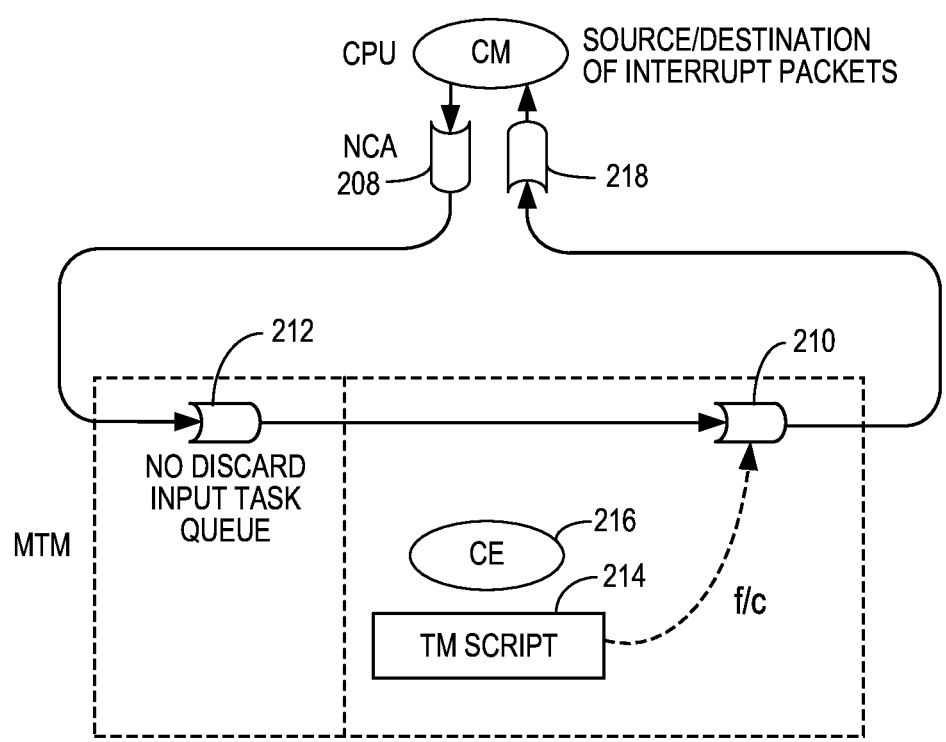
Figure 15:
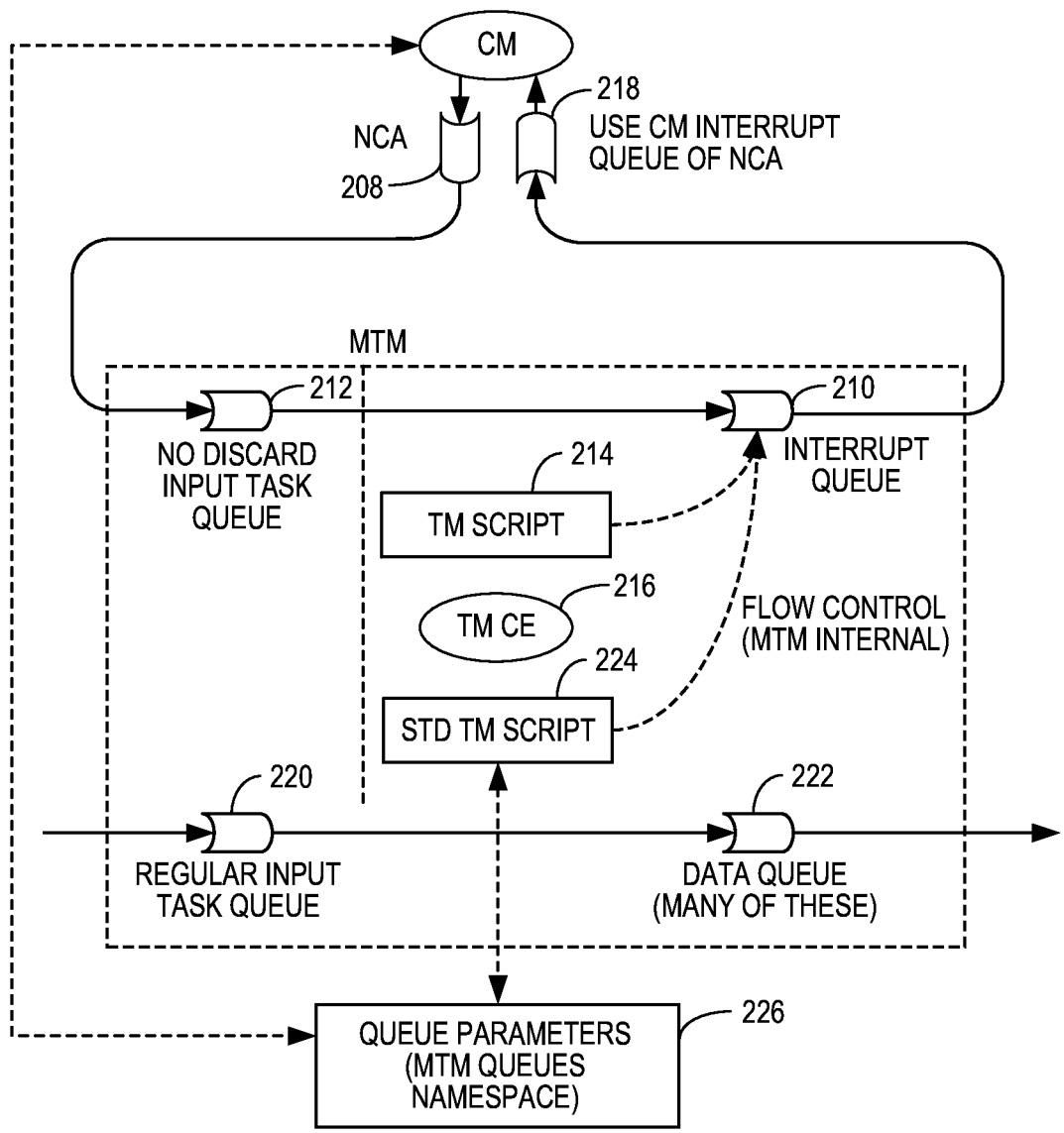
Figure 16:
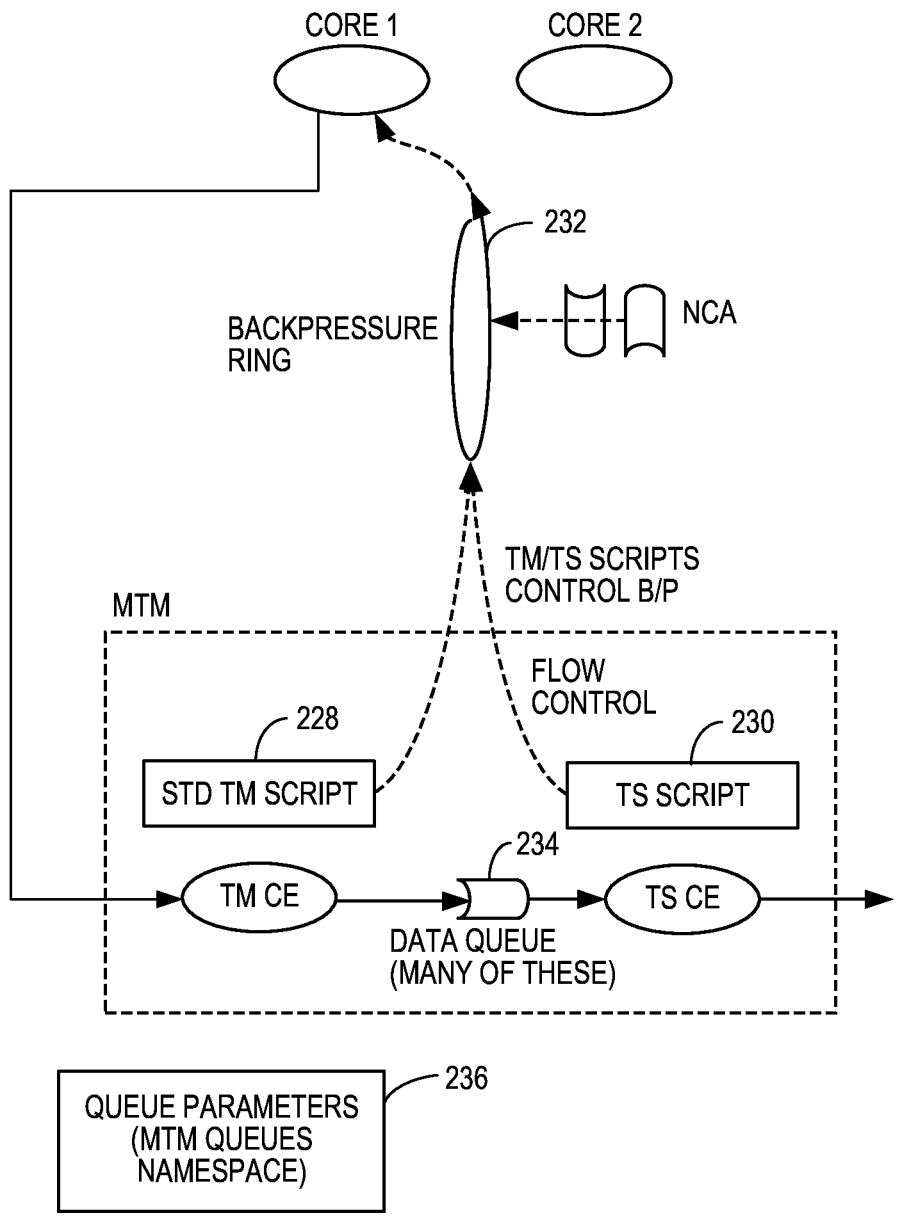

FIG. 9 illustrates one preferred embodiment of the NPU of the multi-core processor of FIG. 6 where the multi-core processor of FIG. 6 is one of the 3400 family of Axxia® Communication Processor (ACPs), the NPU is the NPU of the one of the 3400 family of ACPs (i.e., an ACP NPU), and backpressure is provided from Input Task Queues (ITQs) of various engines of the ACP NPU to a scheduler of the ACP NPU according to one embodiment of the present disclosure;

FIG. 10 illustrates a Modular Traffic Manager (MTM) engine flow control scheduler that includes the MTM light and complex processing scheduler and MTM output shapers of FIG. 9 in more detail according to one embodiment of the present disclosure;

FIG. 11 illustrates the MTM light and complex processing scheduler of FIG. 10 and an input processing scheduler of the Modular Packet Processor (MPP) engine of the ACP NPU according to one embodiment of the present disclosure;

FIG. 12 illustrates the MTM light and complex processing scheduler of FIG. 10 and an input processing scheduler of one of the Security Protocol Processor (SPP), the Packet Integrity Check (PIC), the Packet Assembly Block (PAB), and the Stream Editor (SED) engines of the ACP NPU according to one embodiment of the present disclosure;

FIG. 13 illustrates the MTM output shapers of FIG. 10 and an input processing scheduler of the Ethernet Input/Output Adaptor (EIOA) engine of the ACP NPU according to one embodiment of the present disclosure;

FIG. 14 illustrates an interrupt mechanism for the ACP NPU according to one embodiment of the present disclosure;

FIG. 15 is a more detailed illustration of the interrupt mechanism of FIG. 14 according to one embodiment of the present disclosure; and FIG. 16 illustrates monitoring and maintaining queue depth in the MTM engine of the ACP NPU according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
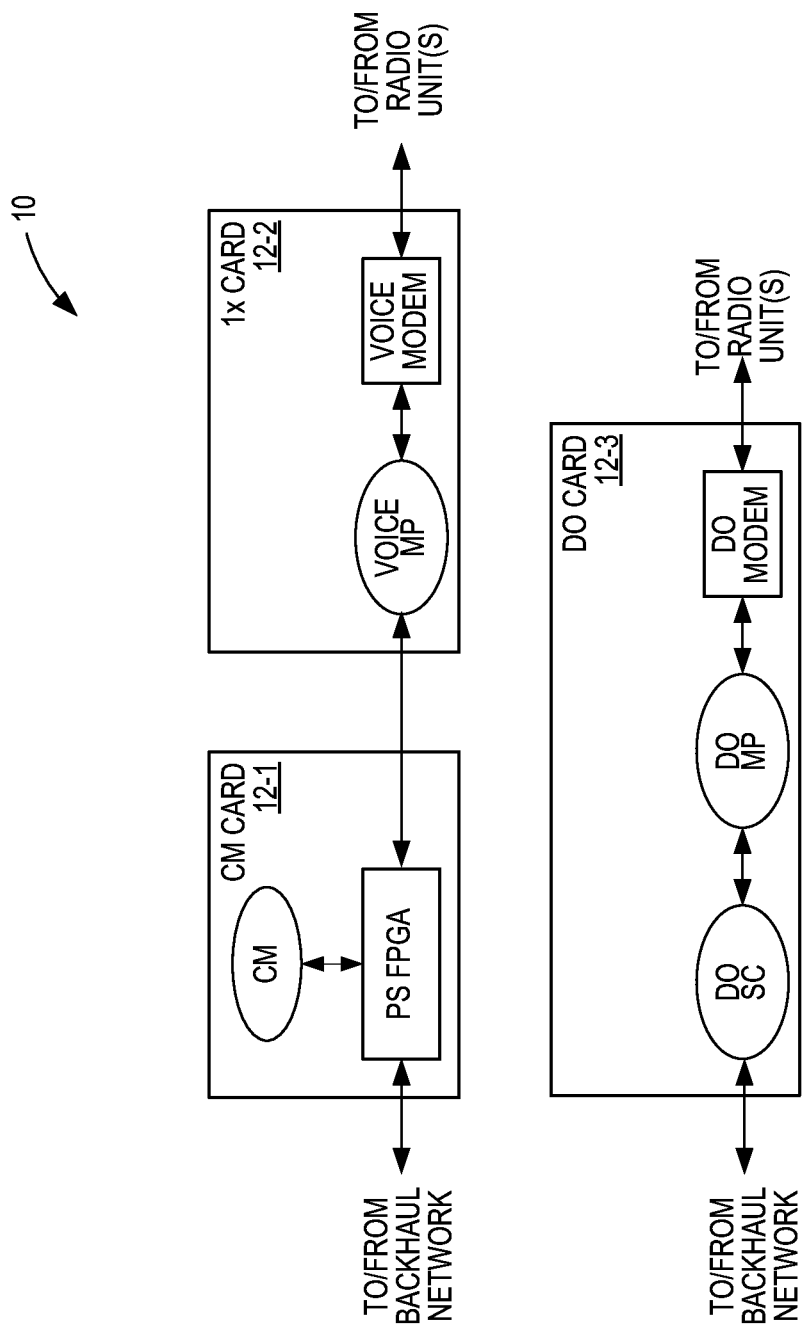
FIG. 1 illustrates a conventional digital baseband unit of a multiple-standard base station.
Figure 2:
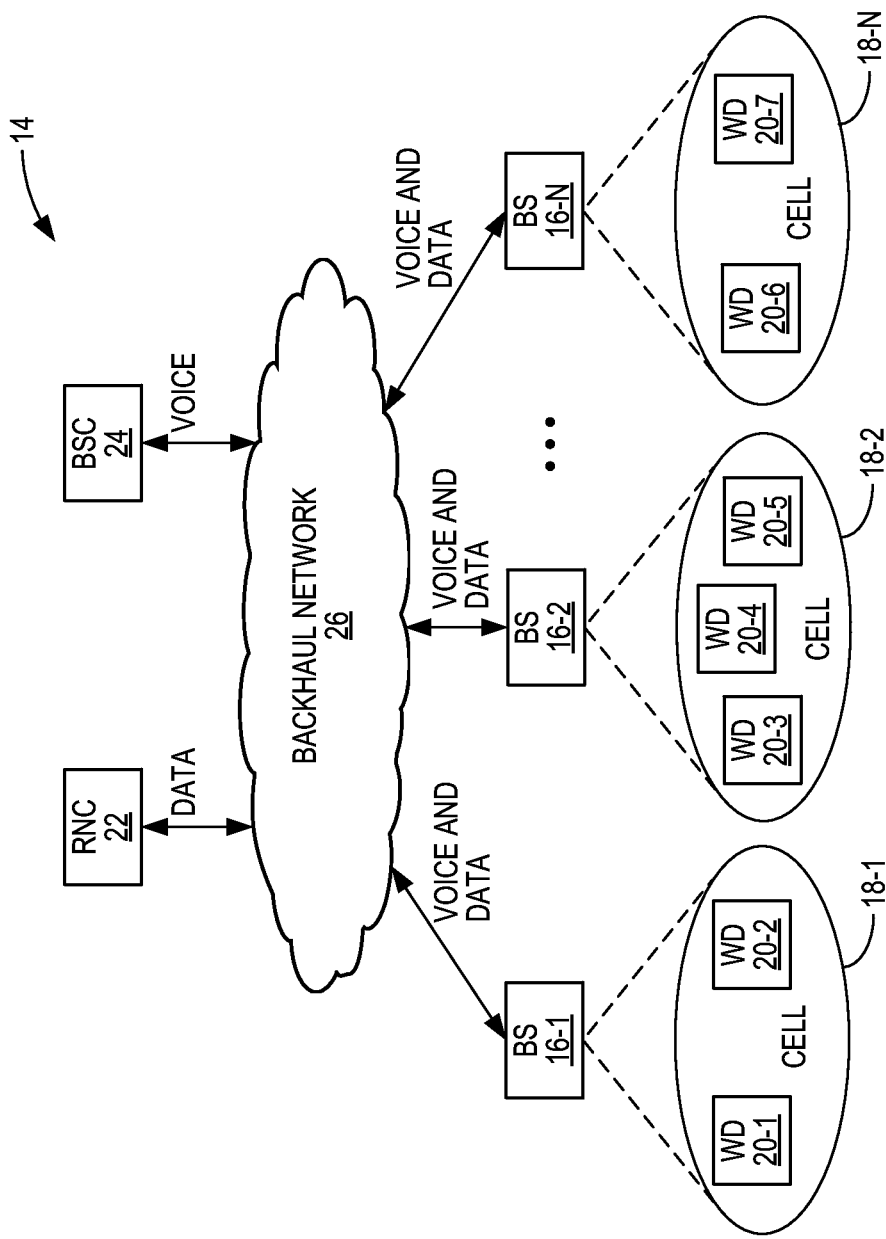
FIG. 2 illustrates a cellular communications network according to one embodiment of the present disclosure.

The present disclosure relates to an advanced digital baseband processor for a base station in a cellular communications network, where the advanced digital baseband processor integrates multiple Radio Access Technologies (RATs). As used herein, a RAT is a radio access technology as defined by a corresponding standard. Some non-limiting examples of RATs are Code Division Multiple Access (CDMA) voice RATs (e.g., $3^{rd}$ Generation Partnership Project 2 (3GPP2) CDMA 1x Radio Transmission Technology (RTT) and 3GPP2 CDMA 1xAdvanced), CDMA Data Only, or Data Optimized, (DO) RATs (e.g., 3GPP2 CDMA Evolution-Data Optimized (EV-DO) and 3GPPS CDMA EV-DO Rev B), 3GPP Long Term Evolution (LTE), or the like. In this regard, FIG. 2 illustrates a cellular communications network 14 that includes base stations (BSs) 16-1 through 16-N (generally referred to herein collectively as base stations 16 and individually as base station 16), where one or more, and potentially all, of the base stations 16 have advanced digital baseband processors (not shown) that integrate multiple RATs according to one embodiment of the present disclosure.

As illustrated, the base stations 16-1 through 16-N serve corresponding cells 18-1 through 18-N (generally referred to herein collectively as cells 18 and individually as cell 18). Specifically, the base station 16-1 serves wireless devices, such as wireless devices 20-1 and 20-2, located in the cell 18-1; the base station 16-2 serves wireless devices, such as wireless devices 20-3 through 20-5, located in the cell 18-2; and the base station 16-N serves wireless devices, such as wireless devices 20-6 and 20-7, located in the cell 18-N. The wireless devices 20-1 through 20-7 are generally referred to herein collectively as the wireless devices 20 and individually as the wireless device 20.

The base stations 16 are connected to a Radio Network Controller (RNC) 22 and a Base Station Controller (BSC) 24 via a backhaul network 26. Notably, the cellular communications network 14 includes a single backhaul network 26 for both voice and data. The backhaul network 26 is preferably an Internet Protocol (IP) based network. In operation, data communications flow between a core network (not shown) and the base stations 16 via the RNC 22 and the backhaul network 26. Similarly, voice communications flow between the core network and the base stations 16 via the BSC 24 and the backhaul network 26.

Figure 3:
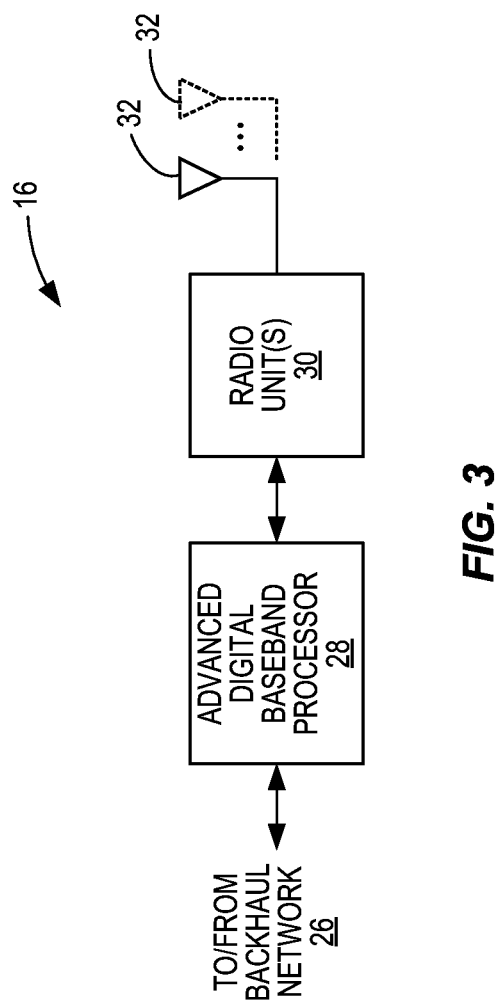
FIG. 3 is a block diagram of a base station that includes an advanced digital baseband processor that integrates multiple Radio Access Technologies (RATs) and one or more radio units according to one embodiment of the present disclosure.

As discussed below in detail, at least some of the base stations 16 are Multiple-Standard (MS) base stations that include advanced digital baseband processors that integrate multiple RATs. In this regard, FIG. 3 is a block diagram of one of the base stations 16 that includes an advanced digital baseband processor 28 that integrates multiple RATs according to one embodiment of the present disclosure. As illustrated, the base station 16 includes the advanced digital baseband processor 28, one or more radio units 30, and one or more antennas 32 connected as shown. In order to integrate the RATs, the advanced digital baseband processor 28 includes shared processing resources that support the RATs. In one embodiment, the advanced digital baseband processor 28 includes a multi-core processor having multiple processor cores, and the shared processing resources that support the RATs are at least a subset, but potentially all, of the processor cores of the multi-core processor. In one preferred embodiment, the multi-core processor operates in an Asymmetric Multi-Processing (AMP) mode in which each RAT is supported by one or more different processor cores of the multi-core processor. In an alternative embodiment, the multi-core processor operates in a Symmetric Multi-Processing (SMP) mode in which the processor cores of the multi-core processor support the RATs in a distributed manner. In another embodiment, the advanced digital baseband processor 28 includes an Application Specific Integrated Circuit (ASIC), and the shared processing resources that support the RATs are processing resources of the ASIC.

The advanced digital baseband processor 28 may include additional shared resources that support the RATs such as, but not limited to, shared network connectivity resources, shared physical resources, shared baseband transport resources, or any combination thereof. The shared network connectivity resources provide network connectivity between the base station 16 and the backhaul network 26 for the RATs. The shared network connectivity resources may include, for example, one or more shared network interfaces (e.g., one or more shared T1/E1 interfaces or the like), or one or more shared routing or switching functions (e.g., shared IP routing, shared Ethernet switching or routing, shared proprietary transport processing or routing, or the like). The shared physical resources may include, for example, shared memory, a shared power supply, a shared synchronization component (e.g., a shared Global Positioning System (GPS) receiver), a shared battery pack, a shared real-time clock, a shared filter and fan, or the like. The shared baseband transport resources may include, for example, a shared multiplexer, a shared demultiplexer, one or more shared baseband transport interfaces, or radio ports, to the one or more radio units 30, or the like. By integrating the RATs, the advanced digital baseband processor 28 provides many advantages over traditional digital baseband units for multi-standard base stations. For example, the cost of the advanced digital baseband processor 28 is substantially reduced as compared to the cost of the traditional digital baseband unit.

Figure 4:
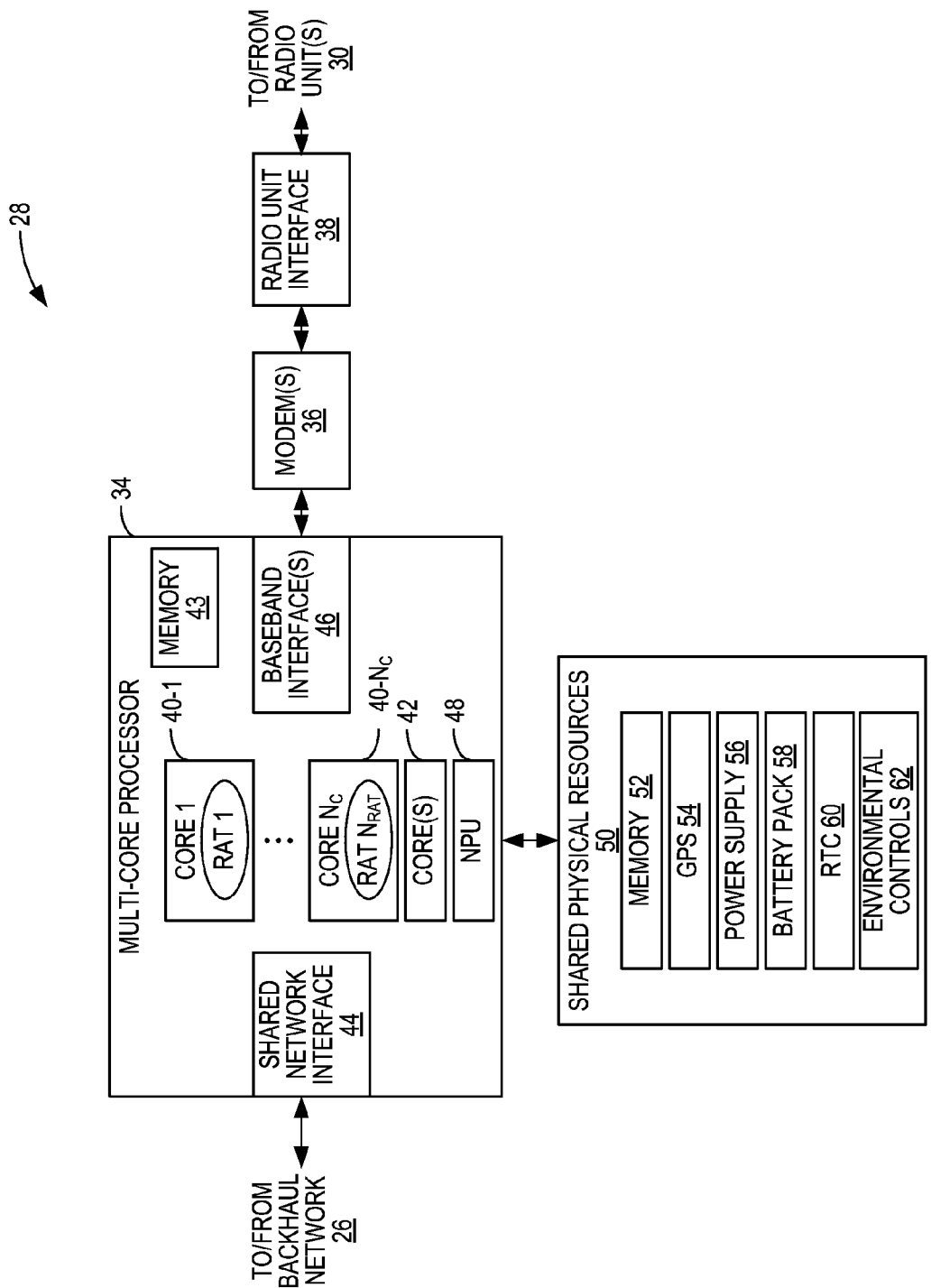
FIG. 4 is a more detailed illustration of the advanced digital baseband processor of FIG. 3 wherein the advanced digital baseband processor includes, among other things, a multi-core processor that integrates the multiple RATs according to one embodiment of the present disclosure.

FIG. 4 is a more detailed illustration of one embodiment of the advanced digital baseband processor 28 of FIG. 3. In this embodiment, the advanced digital baseband processor 28 includes a multi-core processor 34, one or more modems 36, and a radio unit interface 38 connected as illustrated. The multi-core processor 34 includes a number ($N_C$) of processor cores 40-1 through 40-$N_C$ that provided shared processing resources that support a number ($N_{RAT}$) of RATs (RAT 1 through RAT $N_{RAT}$). The processor cores 40-1 through 40-$N_C$ are generally referred to herein collectively as processor cores 40 and individually as processor core 40. In this embodiment, the multi-core processor 34 is configured in an AMP mode in which each RAT is supported by one or more different processor cores 40. For example, a particular RAT may be implemented as two or more separate functions (e.g., a system controller and a modem processing function), where each function of the RAT is supported by a different processor core 40. Further, the processor core(s) 40 that support one RAT are different from the processor core(s) 40 that support the other RAT(s). In this manner, the RATs are supported by shared processing resources of the multi-core processor 34. Optionally, the multi-core processor 34 may include one or more additional processor cores 42 that may be used for functions other than those for the RATs.

In addition, it should be noted that one of the processor cores 40 operates as an Operations and Maintenance (OAM) master, or manager, for all of the processor cores 40. More specifically, each of the processor cores 40 typically needs to access some peripheral device(s) and/or resource(s). Because these peripheral device(s) and/or resource(s) are shared by the processor cores 40, one of the processor cores 40 operates as the OAM master in order to prevent collisions or inconsistency problems. The OAM master controls and manages the peripheral device(s) and/or resources and internally communicates with the other processor cores 40. If the other processor cores 40 need access to the peripheral device(s) and/or resource(s), those processor cores 40 first communicate with the OAM master, and the OAM master then delegates the access to the peripheral device(s) and/or resource(s).

The multi-core processor 34 preferably includes shared memory for the processor cores 40 as well as the processor core(s) 42. The shared memory is implemented within internal memory 43 of the multi-core processor 34 and can be used for various purposes such as, for example, inter-core communication by reading and writing information to a shared space within the shared memory. Note that all or a portion of the internal memory 43 may be shared memory. For example, some of the internal memory 43 may be allocated to particular processor cores 40 or 42 and some of the internal memory 43 may be shared memory for all or at least multiple processor cores 40 and/or 42. The multi-core processor 34 also includes a shared network interface 44 for the processor cores 40 that support the RATs (and possibly the additional processor core(s) 42). The shared network interface 44 provides network connectivity to the backhaul network 26. In a similar manner, the multi-core processor 34 includes one or more baseband interfaces 46 that provide baseband connectivity to the one or more modems 36. Lastly, the multi-core processor 34 also includes a Network Processing Unit (NPU) 48. As discussed below in detail, the NPU 48 provides routing of packets both for backhaul communications and inter-core communications as well as flow control.

The advanced digital baseband processor 28 also includes shared physical resources 50 that assist in the integration of the RATs. The shared physical resources 50 include, in this embodiment, shared memory 52, a shared synchronization component which in this example is a shared GPS receiver 54, a shared power supply 56, a shared battery pack 58, a shared Real-Time Clock (RTC) 60, and one or more shared environmental controls 62 (e.g., one or more shared filters and fans). Note that while some examples of the shared physical resources 50 are illustrated in FIG. 4, the shared physical resources 50 may include additional or alternative shared physical resources.

Figure 5:
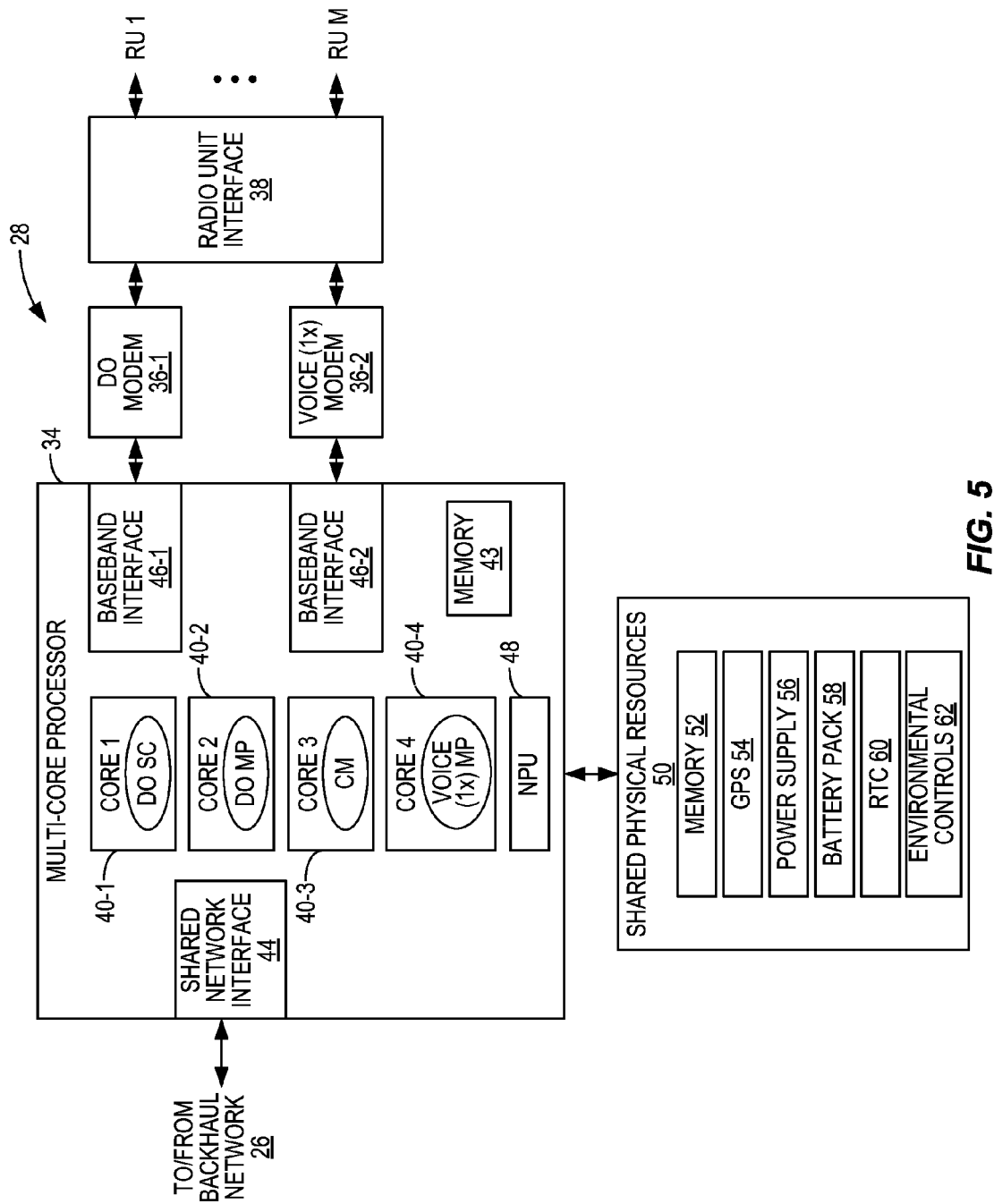
FIG. 5 is a more detailed illustration of the advanced digital baseband processor of FIG. 2 in which the multi-core processor integrates $3^{rd}$ Generation Partnership Project 2 (3GPP2) 1x Radio Transmission Technology (RTT) and 3GPP2 Evolution-Data Optimized (EV-DO) radio access technologies according to one embodiment of the present disclosure.

FIG. 5 illustrates the advanced digital baseband processor 28 of FIG. 4 according to one preferred embodiment of the present disclosure. In this embodiment, the advanced digital baseband processor 28 integrates a CDMA voice RAT (e.g., 3GPP2 CDMA 1xRTT or 3GPP2 CDMA 1xAdvance) and a CDMA DO RAT (e.g., 3GPP2 CDMA EV-DO or 3GPP2 CDMA EV-DO Rev B). The CDMA DO RAT is implemented as a DO System Controller (DO SC) supported by the processor core 40-1 and a DO Modem Processor (DO MP) supported by the processor core 40-2. More specifically, the DO SC is implemented as software that is executed by the processor core 40-1, and the DO MP is implemented as software that is executed by the processor core 40-2. The CDMA voice RAT is implemented as a Control Module (CM) supported by the processor core 40-3 and a voice, or 1x, Modem Processor (MP) supported by the processor core 40-4. More specifically, the CM is implemented as software that is executed by the processor core 40-3, and the voice MP is implemented as software that is executed by the processor core 40-4. Further, in this embodiment, the one or more modems 36 (FIG. 4) include a DO modem 36-1 modem connected to the multi-core processor 34 via a baseband interface 46-1 and a voice, or 1x, modem 36-2 connected to the multi-core processor 34 via a baseband interface 46-2.

Preferably, the backhaul network 26 is an IP network. IP packets carried over the backhaul network 26 include DO IP packets that carry data as their payloads and voice and/or control IP packets that carry voice and/or control information as their payloads. Voice and control information are preferably contained in Base Station Communication Network (BCN) packets, where multiple BCN packets are carried as the payload of a single IP packet. For incoming DO IP packets from the backhaul network 26, the incoming DO IP packets are routed to the processor core 40-1 and processed by the DO SC. The DO SC operates to control the DO link connection setup with the RNC. Next, the DO IP packets are routed to the processor core 40-2 and processed by the DO MP. The DO MP operates to provide communication with the DO modem 36-1. The DO modem 36-1 receives the output of the DO SC and generates corresponding baseband signals. The baseband signals generated by the DO modem 36-1 are output to at least one of the one or more radio units 30 via the radio unit interface 38. Conversely, incoming data signals from the radio units 30 (FIG. 3) are received by the DO modem 36-1 via the radio unit interface 38. The DO modem 36-1 processes the incoming data signals to provide digital baseband signals to the processor core 40-2 where the digital baseband signals are processed by the DO MP. The resulting IP packets output by the DO MP are routed to the processor core 40-1 and processed by the DO SC. The IP packets are then output to the backhaul network 26 via the shared network interface 44.

For incoming IP packets from the backhaul network 26 carrying voice and/or control information, as discussed above, the voice and/or control information is preferably carried in BCN packets that are themselves carried as a payload of one or more IP packets. Preferably, multiple BCN packets are concatenated into a payload of a single IP packet. Upon receiving an IP packet that carries one or more BCN packets, the NPU 48 performs IP-to-BCN deconcatenation to extract the BCN packets from the payload of the IP packet. The BCN packets carrying voice information are then routed, by the NPU 48, to the processor core 40-3 for processing by the CM. The CM operates as a general resource controller of the base station 16. After processing by the CM, the BCN packets are routed to the processor core 40-4 for processing by the voice MP. The voice MP operates to provide communication with the voice modem 36-2. Notably, BCN packets carrying control information are identified and routed by the NPU 48 in a suitable manner. The voice modem 36-2 receives the output of the voice MP via the baseband interface 46-2 and generates corresponding baseband signals, which are output to at least one of the radio units 30 via the radio unit interface 38. Conversely, incoming voice signals from the radio units 30 are received and processed by the voice modem 36-2. The output of the voice modem 36-2 is provided to the processor core 40-4 and processed by the voice MP. The resulting BCN packets are routed to the processor core 40-3 for processing by the CM. The NPU 48 concatenates the BCN packets into a payload of one or more IP packets and routes the IP packet(s) to the backhaul network 26 via the shared network interface 44.

In this embodiment, the radio unit interface 38 provides a baseband transport interface, or radio port, for each of the radio units 30 connected to the advanced digital baseband processor 28. Preferably, the baseband transport interfaces are High Speed Serial Link (HSSL) interfaces, Common Packet Radio Interface (CPRI) interfaces, or the like. In operation, the radio unit interface 38 time multiplexes the outputs of the DO modem 36-1 and the voice modem 36-2 to provide a baseband output signal for each of the radio units 30, where the baseband output signal carries both voice and data. In a similar manner, the radio unit interface 38 demultiplexes baseband input signals from the radio units 30 to provide corresponding data and voice signals to the DO modem 36-1 and the voice modem 36-2, respectively.

FIG. 6 is a more detailed illustration of the advanced digital baseband processor 28 of FIG. 5 according to one embodiment of the present disclosure. In particular, FIG. 6 includes a more detailed illustration of the NPU 48 and the radio unit interface 38. As illustrated, the NPU 48 includes a Layer 2 (L2) switch function 64 and a BCN switch function 66. The L2 switch function 64 receives IP packets from and sends IP packets to the backhaul network 26 via the shared network interface 44, which in this example is a Serial Gigabit Media Independent Interface (SGMII) interface. Also, in this embodiment, the L2 switch function 64 receives IP packets from and sends IP packets to a daisy-chain of one or more additional base stations via a daisy-chain port 68, which in this embodiment is a SGMII interface. In operation, the L2 switch function 64 determines whether incoming IP packets from the backhaul network 26 are destined for the base station 16 into which the advanced digital baseband processor 28 is incorporated or destined for another base station (not illustrated) connected to the daisy-chain port 68. If an IP packet is destined for another base station connected to the daisy-chain port 68, the L2 switch function 64 routes the IP packet to the daisy-chain port 68.

If the IP packet is destined for the base station 16, the L2 switch function 64 determines whether the IP packet is: (1) a DO packet or (2) an IP packet carrying BCN packets as its payload. If the IP packet is a DO packet, the L2 switch function 64 routes the IP packet to the processor core 40-1 for processing by the DO SC. After processing by the DO SC, the IP packet is routed to the processor core 40-2 via the NPU 48. At the processor core 40-2, the IP packet is processed by the DO MP to provide a digital quadrature signal (I,Q) to the DO modem 36-1 via a Peripheral Component Interconnect Express (PCIE) interface 70-1. The DO modem 36-1 modulates the digital quadrature signal (I,Q) from the DO MP and outputs a modulated digital quadrature signal (I,Q) to the radio unit interface 38.

If the L2 switch function 64 determines that the IP packet is an IP packet carrying BCN packets as its payload, the L2 switch function 64 provides the IP packet to the BCN switch function 66 for IP-to-BCN deconcatenation. As used herein, IP-to-BCN deconcatenation is a process by which the BCN packets are obtained, or extracted, from the payload of the IP packet. The BCN switch function 66 then routes the BCN packets to the appropriate destination. In particular, for BCN packets that carry voice information, the BCN switch function 66 routes the BCN packets to the processor core 40-3 for processing by the CM. After processing by the CM, the BCN switch function 66 routes the BCN packets to the processor core 40-4 for processing by the voice MP. The voice MP outputs a digital quadrature signal (I,Q) to the voice modem 36-2 via a PCIE interface 70-2. The voice modem 36-2 modulates the digital quadrature signal (I,Q) from the voice MP and outputs a modulated digital quadrature signal (I,Q) to the radio unit interface 38.

At the radio unit interface 38, a mapping and summing function 72 time multiplexes the modulated digital quadrature signals (I,Q) from the DO modem 36-1 and the voice modem 36-2, and optionally modulated digital quadrature signals (I,Q) from one or more expansion modules and BCN packets received from the NPU 48 via a SGMII interface 74, to provide a time-multiplexed signal. A HSSL function 76 then converts the time-multiplexed signal output by the mapping and summing function 72 into an HSSL signal under control of a control module 78. The control module 78 provides HSSL link setup and status monitoring. The control module 78 sends control messages to and receives control messages from the CM via a PCIE interface 80. The control messages include, for example, control messages for the HSSL link. A multiplexer/demultiplexer function 82 then demultiplexes the HSSL signal to provide a desired signal to each of the radio units 30. The signals to the radio units 30 are preferably provided via corresponding HSSLs or CPRI links.

Incoming signals from the radio units 30 are processed in a similar manner. More specifically, incoming signals from the radio units 30 are multiplexed onto an HSSL by the multiplexer/demultiplexer function 82. The mapping and summing function 72 performs time-demultiplexing to provide a modulated quadrature DO signal to the DO modem 36-1 and a modulated quadrature voice signal to the voice modem 36-2. The DO modem 36-1 demodulates the modulated quadrature DO signal to provide a demodulated DO signal to the processor core 40-2 via the PCIE interface 70-1 for processing by the DO MP. The output of the DO MP is then provided to the processor core 40-1 for processing by the DO SC. The resulting IP packet is provided to the NPU 48 where the L2 switch function 64 routes the IP packet to the backhaul network 26 via the shared network interface 44.

The voice modem 36-2 demodulates the modulated quadrature voice signal to provide a demodulated voice signal to the processor core 40-4 via the PCIE interface 70-2 for processing by the voice MP. The BCN switch function 66 routes resulting BCN packets output by the voice MP to the processor core 40-3 for processing by the CM. The BCN switch function 66 then processes BCN packets output by the CM to perform BCN-to-IP concatenation. As used herein, BCN-to-IP concatenation is a process by which BCN packets are concatenated into a payload of an IP packet. Notably, additional BCN packets from one or more expansion modules and/or the radio units 30 may also be processed for BCN-to-IP concatenation. These additional BCN packets may include, for example, BCN packets that carry control information, real traffic, or other user specific information. After BCN-to-IP concatenation, the BCN switch function 66 provides the IP packet to the L2 switch function 64, which in turn routes the IP packet to the backhaul network 26 via the shared network interface 44.

Figure 7:
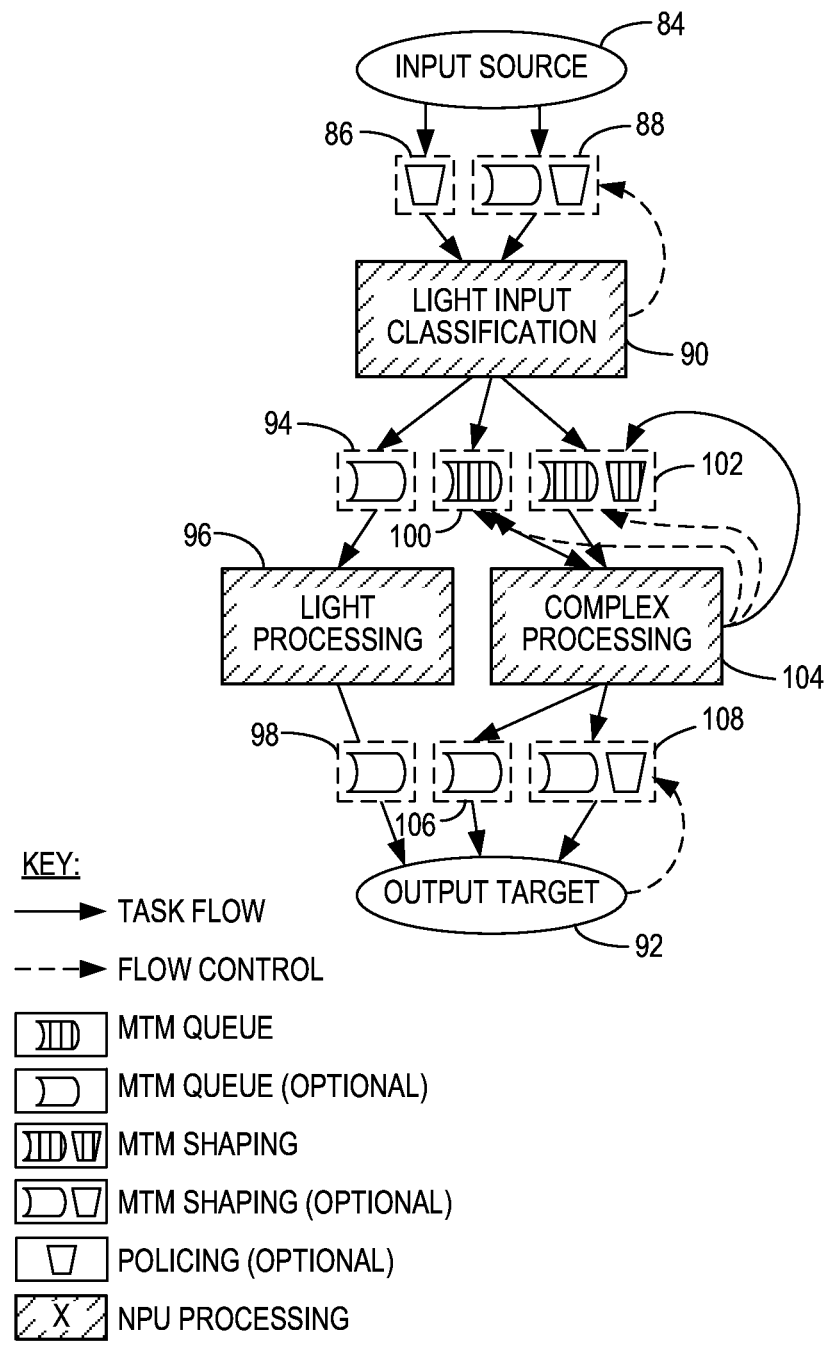
FIG. 7 illustrates the operation of a Network Processing Unit (NPU) of the multi-core processor of FIG. 6 according to one embodiment of the present disclosure.

FIG. 7 illustrates the operation of the NPU 48 of FIG. 6 in more detail according to one embodiment of the present disclosure. Notably, in this embodiment, the multi-core processor 34 is a multi-core processor in the Axxia® Communications Processor (ACP) 3400 Family of multi-core processors designed and sold by LSI Corporation and, in one preferred embodiment, is the ACP 3448 multi-core processor. As such, some of the terminology used in the description of the NPU 48 and the operation thereof is terminology that is specific to the ACP 3400 Family of multi-core processors and, in particular, the ACP 3448 multi-core processor. However, it should be understood that many of the concepts described herein in relation to the NPU 48 and the operation thereof are not limited to the ACP 3400 Family of multi-core processors and may be applicable to other multi-core processors suitable for use in the advanced digital baseband processor 28. The NPU 48 is highly flexible and can be programmed to operate in a desired manner. In this embodiment, the NPU 48 is programmed to operate in the manner described below.

As illustrated, tasks from an input source 84 of the NPU 48 are optionally passed through a policing function 86 or a shaping function 88 depending on, for instance, the input source 84. The shaping function 88 is provided by a Modular Traffic Manager (MTM) engine of the NPU 48 and is therefore also referred to herein as an MTM shaping function 88. As used herein, a task includes a pointer to an incoming packet of the NPU 48, where the incoming packet is stored in memory and the task includes a pointer to the incoming packet stored in memory. The incoming packet is either an IP packet or a BCN packet. The input source 84 may be the shared network interface 44, the daisy-chain port 68, one of the processor cores 40, or the radio unit interface 38. As one example, the incoming tasks may be passed through the policing function 86 if the input source 84 is the shared network interface 44, the incoming tasks may be passed through the MTM shaping function 88 if the input source 84 is the radio unit interface 38, and the incoming tasks may not pass through either the policing function 86 or the MTM shaping function 88 if the input source 84 is one of the processor cores 40.

The policing function 86 may be used to monitor for overloads and data bursts that exceed the processing capability of the multi-core processor 34. Under normal operating conditions, an overload or data burst should never occur. However, malicious attacks, for example, may result in overloads or data bursts at the advanced digital baseband processor 28 that exceed the processing capability of the multi-core processor 34. If an overload or data burst occurs, rate shaping may be performed to maintain low latency and good quality of service. The MTM shaping function 88 may be used to perform rate shaping as desired for a particular application. For example, the MTM shaping function 88 may, for example, perform rate shaping to reduce a data rate for a flow that exceeds the capability of the multi-core processor 34 for that flow.

Next, the NPU 48 includes a light input classification function 90 that classifies incoming tasks as needing either light processing or complex processing. More specifically, during light input classification, the NPU 48 determines whether the base station 16 is the destination of the incoming packet. In one embodiment, the NPU 48 examines a destination Media Access Control (MAC) address for the incoming packet to determine whether the destination MAC address is that of the base station 16. If so, the corresponding incoming task is classified as needing complex processing. If the destination MAC address is not that of the base station 16, the corresponding incoming task is classified as needing only light processing. If the incoming task is classified for light processing, light processing of the task is performed and the corresponding incoming packet is passed to an appropriate output target 92. If the incoming task is classified for complex processing, complex processing of the task is performed and one or more resulting packets are provided to the appropriate output target(s) 92.

More specifically, in the ACP multi-core processor embodiment, light input classification is performed by a Modular Packet Processor (MPP) engine of the NPU 48. The MPP engine performs light input classification by performing a MAC address look-up for the destination MAC address of the incoming packet. If the incoming task is classified as needing only light input classification, the incoming task is provided to an MTM queue 94 in an MTM engine of the NPU 48 to be scheduled for light processing. As discussed below, among other things, the MTM engine performs scheduling for a number of engines of the NPU 48 that perform both light and complex processing. In this embodiment, the MTM engine schedules the incoming task in the MTM queue 94 for processing by an appropriate NPU engine that performs a light processing function 96. After light processing, the incoming task is inserted into another MTM queue 98 to be scheduled by the MTM engine for output to the appropriate output target 92. It should be noted that, in some embodiments, light processing may consist of passing the incoming packet directly from the input source 84 to the appropriate output target 92. For example, if the incoming packet is an IP packet destined for a base station connected to the daisy-chain port 68, the IP packet may be classified for light processing and, in response, forwarded directly to the daisy-chain port 68 without further processing.

If the incoming task is classified as needing complex processing, the incoming task is either inserted into an MTM queue 100 or passed through an MTM shaping function 102. The MTM engine then schedules the incoming task for processing by an appropriate NPU engine for a first stage of a complex processing function 104. As illustrated, after processing by the NPU engine, the incoming task may be returned to the MTM shaping function 102 (or an MTM queue) such that the incoming task is scheduled for processing by an appropriate NPU engine for a second stage of the complex processing function 104. This process continues until complex processing is complete. Once complex processing is complete, the incoming task or multiple resulting tasks (e.g., a separate task for each BCN packet resulting from IP-to-BCN deconcatenation) are optionally inserted into an MTM queue 106 or MTM shaping function 108 before being output to the appropriate output target(s) 92.

As an example, an incoming IP packet carrying multiple BCN packets as its payload is preferably processed by the NPU 48 as follows. First, the MPP engine performs light input classification based on the destination MAC address of the incoming IP packet. Assuming that the destination MAC address of the incoming packet is that of the base station 16, the MPP engine classifies the incoming packet (or more precisely the corresponding incoming task) as needing complex processing. As a result, the incoming task for the incoming IP packet is inserted into the MTM queue 100 of the MTM engine. The MTM engine then schedules the incoming task for processing by an appropriate NPU engine for the first stage of the appropriate complex processing function 104. The NPU engine then returns the incoming task or one or more resulting tasks to the MTM engine for scheduling. This process is iteratively repeated until complex processing function is complete. In this example, complex processing includes Ethernet processing including integrated checking and MAC address filtering; IP layer processing including IP integrity checking and IP Destination Address (DA) routing; IP anti-relay and IP authentication; User Datagram Protocol (UDP) processing including integrity checking and UDP port filtering; IP datagram encapsulation; IP-to-BCN deconcatenation; BCN validation; BCN routing; BCN/ACN (Application Communication Network) segmentation and reassembly; exception processing; and Quality of Service (QoS) processing. Note that BCN/ACN segmentation includes, for a typical scenario, dividing an ACN packet into several pieces each of which is included in a BCN payload with a BCN header pre-attached. Re-assembly is the reverse. Payloads of a series of BCN packets are concatenated (with BCN headers stripped), where an ACN header is added for encapsulation. After complex processing, multiple BCN packets have been extracted from the payload of the incoming IP packet and routed to the appropriate output target(s) 92.

Before proceeding, it should be noted that FIG. 7 also illustrates flow control performed by the NPU 48. As illustrated, flow control is provided via backpressure from the light input classification function 90 to the MTM shaping function 88, backpressure from the complex processing function 104 to the MTM queue 100 or to the MTM shaping function 102 (or an MTM scheduler of the MTM engine), or backpressure from the output target 92 to the MTM shaping function 108 (or the MTM scheduler of the MTM engine). As discussed below in detail, backpressure is applied when an Input Task Queue (ITQ) of an NPU engine exceeds a predetermined threshold. In response to the backpressure, the MTM engine stops scheduling incoming tasks for processing by the downstream NPU engines.

Figure 8:
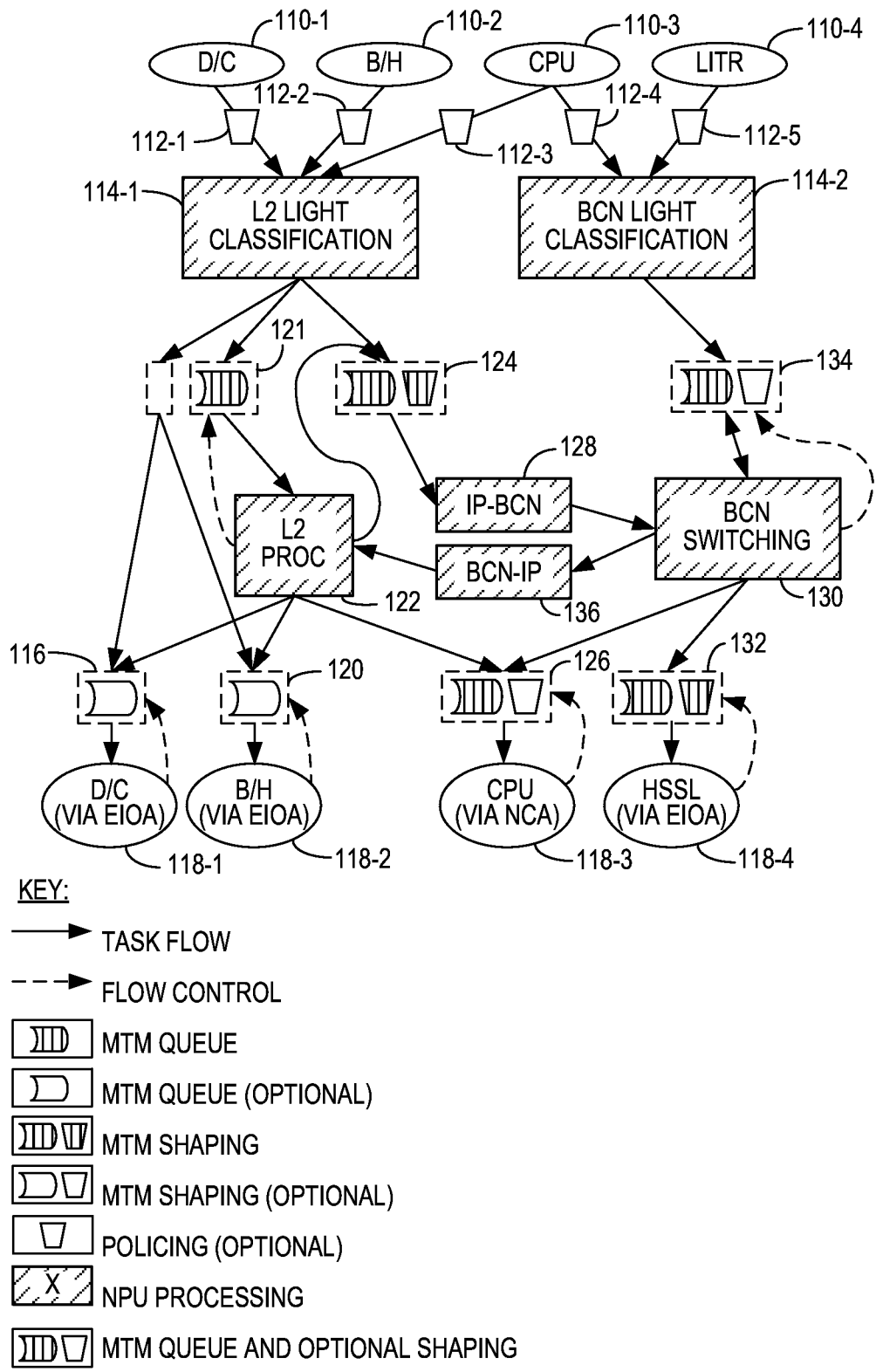
FIG. 8 is a more detailed illustration of the operation of the NPU of the multi-core processor of FIG. 6 according to one embodiment of the present disclosure.

FIG. 8 is a more detailed version of FIG. 7 that illustrates the operation of the NPU 48 according to one particular embodiment of the present disclosure. Again, in this embodiment, the multi-core processor 34 is a multi-core processor in the ACP 3400 Family of multi-core processors designed and sold by LSI Corporation and, in one preferred embodiment, is the ACP 3448 multi-core processor. As such, some of the terminology used in the description of the NPU 48 and the operation thereof is terminology that is specific to the ACP 3400 Family of multi-core processors and, in particular, the ACP 3448 multi-core processor. However, it should be understood that many of the concepts described herein in relation to the NPU 48 and the operation thereof are not limited to the ACP 3400 Family of multi-core processors and may be applicable to other multi-core processors suitable for used in the advanced digital baseband processor 28. Again, the NPU 48 is highly flexible and can be programmed to operate in a desired manner. In this embodiment, the NPU 48 is programmed to operate in the manner described below.

As illustrated, tasks from input sources 110-1 through 110-4 of the NPU 48 are optionally passed through policing functions. The input sources 110-1 through 110-4 are generally referred to herein collectively as input sources 110 and individually as input source 110. The input sources 110 of the NPU 48 include a daisy-chain (D/C) input source 110-1 that corresponds to the daisy-chain port 68, a backhaul (B/H) input source 110-2 that corresponds to the shared network interface 44 to the backhaul network 26, a number of Central Processing Unit (CPU) input sources 110-3 that correspond to the processor cores 40, and a Layer 1 Transmitter and Receiver (LITR) input source 110-4 that corresponds to the radio unit interface 38. Optionally, incoming tasks from the input sources 110 may pass through policing functions 112-1 through 112-5 as illustrated. The policing functions 112-1 through 112-5 are generally referred to herein collectively as policing functions 112 and individually as policing function 112.

As illustrated, the NPU 48 performs an L2 light input classification function 114-1 for incoming tasks from the D/C input source 110-1, the B/H input source 110-2, and the CPU input source(s) 110-3 corresponding to at least some of the processor cores 40 (i.e., the processor cores 40-1, 40-2, and 40-3). Similarly, the NPU 48 performs a BCN light input classification function 114-2 for incoming tasks from the CPU input source(s) 110-3 that corresponds to at least some of the processor cores 40 (i.e., the processor cores 40-3 and 40-4) and the LITR input source 110-4. Regarding the L2 light input classification function 114-1, the MPP engine of the NPU 48 determines whether the MAC address of the incoming packet identified by the incoming task is that of the base station 16. Note that IP packets exchanged between the DO SC and the DO MP cores are exchanged over, in this embodiment, a private tunnel through the NPU 48. If the destination MAC address does not match that of the base station 16, in one embodiment, the MPP engine of the NPU 48 inserts the incoming task into either an MTM queue 116 for output of the corresponding incoming IP packet to a D/C output target 118-1 via, in this example, an Ethernet Input/Output Adaptor (EIOA) engine of the NPU 48 or an MTM queue 120 for output of the corresponding IP packet to a B/H output target 118-2 via the EIOA engine of the NPU 48 as is appropriate. The D/C output target 118-1 corresponds to the daisy-chain port 68, and the B/H output target 118-2 corresponds to the shared network interface 44 to the backhaul network 26. In an alternative embodiment, the MPP engine inserts the incoming task into an MTM queue 121 to be scheduled for and passed to an L2 processing function 122. The L2 processing function 122 then passes the incoming task to either the MTM queue 116 for output of the corresponding input packet to the D/C output target 118-1 or the MTM queue 120 for output of the corresponding input packet to the B/H output target 118-2.

If the destination MAC address matches that of the base station 16, complex processing is needed. As such, the MPP engine either inserts the incoming task into the MTM queue 121 to be scheduled for and passed to the L2 processing function 122 or passes the incoming task thorough an MTM shaping function 124 of the MTM engine depending on the particular implementation. For this discussion, assume that the incoming task is inserted into the MTM queue 121 to be scheduled for and processed by the L2 processing function 122. To provide the L2 processing function 122, the NPU 48 passes the incoming task through one or more NPU engines that perform one or more L2 processing operations such as, for example, Ethernet processing, IP processing (e.g., IP integrity checking and IP DA address routing), IP authentication, and UDP processing.

After L2 processing, if the incoming IP packet is a DO packet, the corresponding incoming task is passed to an MTM queue and optional shaping function 126 for output to a CPU output target 118-3 that corresponds to one of the processor cores 40-1 and 40-2 for DO processing via a Nuevo CPU Adaptor (NCA) engine of the NPU 48. Note that the NCA engine is a hardware engine that connects, in one embodiment, a PowerPC™ CPU complex with the ACP3400 data path accelerator. Conversely, if the incoming IP packet has a payload that includes multiple BCN packets, after L2 processing, the incoming task is passed to the MTM shaping function 124 and then scheduled by the MTM engine for processing by one or more NPU engines that perform an IP-to-BCN deconcatenation function 128. The MTM shaping function 124 controls the data rate to downstream processing engines, which may be desirable in some embodiments. After IP-to-BCN deconcatenation, multiple tasks for corresponding BCN packets extracted from the incoming IP packet are processed by one or more NPU engines that perform a BCN switching function 130 (e.g., one or more BCN switching operations such as BCN validation and BCN routing). As a result of BCN switching, each of the BCN packets is routed to either one of the CPU output targets 118-3 or an HSSL output target 118-4 that corresponds to the radio unit interface 38 via the EIOA engine of the NPU 48. When routing the BCN packets to the appropriate output target 118-3 or 118-4, the corresponding tasks are passed from the BCN switching function 130 to the MTM queue and optional shaping function 126 or an MTM shaping function 132, respectively.

As illustrated, the NPU 48 also performs the BCN light input classification function 114-2 for incoming tasks from at least some of the processor cores 40 (i.e., the processor cores 40-3 and 40-4) and the radio unit interface 38. Regarding BCN light input classification, the MPP engine of the NPU 48 receives the incoming task and, since the corresponding packet is a BCN packet, passes the incoming task to an MTM queue and optional shaping function 134. The incoming task is then passed through one or more NPU engines that provide the BCN switching function 130 (e.g., one or more NPU engines that perform one or more BCN operations such as BCN validation, BCN routing, and BCN/ACN reassembly).

As a result of BCN switching, if the BCN packet is destined for one of the processor cores 40, the BCN packet is routed to the MTM queue and optional shaping function 126 for output to the appropriate processor core 40. Likewise, if the BCN packet is destined for one of the radio units 30, the BCN packet is routed to the MTM shaping function 132 for output to the radio unit interface 38. Conversely, if the BCN packet is destined for either the daisy-chain port 68 or the backhaul network 26, multiple incoming BCN packets having the same destination are concatenated into a single IP packet. In order to perform BCN-to-IP concatenation, the MTM engine of the NPU 48 passes the BCN packets having the same destination through one or more NPU engines that perform a BCN-to-IP concatenation function 136. A task corresponding to the resulting IP packet is then passed through one or more NPU engines that perform the L2 processing function 122. As a result of the L2 processing, the IP packet is routed to either the daisy-chain port 68 or the backhaul network 26 as is appropriate.

As discussed above, the NPU 48 additionally provides flow control. In FIG. 8, flow control is provided via backpressure from the L2 processing function 122 to the MTM queue 121 as indicated by the dashed arrow. In addition, flow control is provided via backpressure from the BCN switching function 130 to the MTM queue and optional shaping function 134 as indicated by the dashed arrow.

The flexibility of the NPU 48 in the architecture of the ACP 3400 Family of multi-core processors makes traditional forms of flow control impossible. In this regard, FIG. 9 illustrates one embodiment of the NPU 48 in which flow control is provided. In this embodiment, each NPU engine including the MPP engine, the MTM engine, a Security Protocol Processor (SPP) engine, a Packet Integrity Check (PIC) engine, a Packet Assembly Block (PAB) engine, a Stream Editor (SED) engine, and the EIOA engine includes a number of ITQs. For instance, each NPU engine may have either two or four ITQs. Notably, the EIOA engine has multiple ports, namely, a backhaul (B/H) port, a daisy-chain (D/C) port, and a LITR port (i.e., a radio unit interface port). The EIOA engine has two ITQs per port. FIG. 9 illustrates four ITQs 138 of the MPP engine referred to herein as MPP ITQ 1 through MPP ITQ 4; four ITQs 140 of the MTM engine referred to herein as MTM ITQ 1 through MTM ITQ 4; four ITQs 142 of the EIOA engine referred to herein as EIOA B/H ITQ 1 and EIOA B/H ITQ 2 of the backhaul port, EIOA D/C ITQ 2 of the daisy-chain port, and EIOA LITR ITQ 1 of the LITR port; two ITQs 144 of the SPP engine referred to herein as SPP ITQ 1 and SPP ITQ 2; two ITQs 146 of the PIC engine referred to herein as PIC ITQ 1 and PIC ITQ 2; two ITQs 148 of the PAB engine referred to herein as PAB ITQ 1 and PAB ITQ 2; and two ITQs 150 of the SED engine referred to herein as SED ITQ 1 and SED ITQ 2.

In FIG. 9, the MPP engine is illustrated as two separate components, namely, an MPP light input classification function 152-1 and an MPP processing component 152-2. Note, however, that the MPP light input classification function 152-1 and the MPP processing component 152-2 are illustrated separately only for clarity and ease of discussion. In reality, the MPP light input classification function 152-1 and the MPP processing component 152-2 are implemented by a single MPP engine of the NPU 48. In a similar manner, the MTM engine is illustrated as an MTM light and complex processing scheduler 154-1 and MTM output shapers 154-2 and 154-3 for clarity and ease of discussion. However, the MTM light and complex processing scheduler 154-1 and the MTM output shapers 154-2 and 154-3 are implemented by a single MTM engine. Also, in FIG. 9, the SPP engine is referenced as SPP engine 156, the PIC engine is referenced as PIC engine 158, the PAB engine is referenced as PAB engine 160, and the SED engine is referenced as SED engine 162.

As discussed above, a task is passed through one or more NPU engines in a programmable order as defined by a virtual pipeline and modified by the NPU engines along the way. Tasks are generated by specialized NPU engines (e.g., the EIOA engine, the MPP engine, and the NCA engine) in response to incoming packets received by the NPU 48. Thus, for example, when an IP packet is received by the NPU 48, the EIOA engine generates an input task for the IP packet. Within the NPU 48, tasks usually represent packets at certain phases of their processing. Output task queues can send tasks to input task queues via a task ring of the NPU 48.

The ITQs of the NPU engines can grow and congest if the associated NPU engine is overloaded by the tasks being presented for processing by that NPU engine. The flow control mechanisms of FIG. 9 deal with congestion of the ITQs in order to prevent unbounded growth and memory exhaustion.

Primarily, flow control is provided via backpressure from many of the ITQs to the MTM light and complex processing scheduler 154-1 when the number of tasks in the ITQs exceeds a predetermined threshold for that particular ITQ. The predetermined thresholds will generally be different for different NPU engines and possibly for different ITQs of the same NPU engine. The thresholds are preferably selected to be high enough to keep all of the NPU engines busy, especially the MPP engine, but low enough to control latency. Where thresholds are implemented as a safety measure (e.g., MPP ITQ 2), the thresholds are configured high enough that exceeding the thresholds should never occur unless the corresponding NPU engine(s) is(are) hung.

In operation, congestion in any of the ITQs that provide flow control to the MTM light and complex processing scheduler 154-1 results in backpressure being provided to the MTM light and complex processing scheduler 154-1 via a backpressure ring of the NPU 48. In response, the MTM light and complex processing scheduler 154-1 stops sending new tasks to ITQs of the downstream NPU engines. Note that many of the ITQs that provide flow control to the MTM light and complex processing scheduler 154-1 receive tasks directly from the MTM engine, in which case the backpressure which stops the MTM light and complex processing scheduler 154-1 makes sense. However, other ITQs (e.g., MPP ITQ 3 and MPP ITQ 4) that provide flow control to the MTM light and complex processing scheduler 154-1 do not receive tasks directly from the MTM light and complex processing scheduler 154-1. For those ITQs, congestion should be alleviated by stopping the tasks sourced by the MTM light and complex processing scheduler 154-1. Preferably, NPU processing for flows that are not sourced from the MTM light and complex processing scheduler 154-1, and will therefore not respond to backpressure, is carefully designed to ensure that these flows use less than half of the available processing bandwidth of the NPU engines. Therefore, by design, the tasks directly arriving from a port to the NPU engines, such as the MPP engine, are guaranteed not to congest the NPU 48 in the light input classification stage even if there is a denial of service attack or storm on one of the Ethernet ports.

Some of the ITQs do not send backpressure to the MTM light and complex processing scheduler 154-1. Namely, the EIOA B/H ITQ 2, the EIOA D/C ITQ 2, the EIOA LITR ITQ 2, and a CPU ITQ 164 do not send backpressure to the MTM light and complex processing scheduler 154-1. Rather, the EIOA B/H ITQ 2 and the EIOA D/C ITQ 2 send backpressure to the MPP light input classification function 152-1 that sources their input tasks, the EIOA B/H ITQ 1 sends backpressure to the MTM output shaper 154-2 that sources its input tasks, and the CPU ITQ 164 sends backpressure to the MTM output shaper 154-3 that sources its input tasks. Note, however, that backpressure from these ITQs is optional.

When backpressure is received by the MTM light and complex processing scheduler 154-1, the MTM light and complex processing scheduler 154-1 stops sending new tasks to the light and complex processing NPU engines. In addition, rather than discarding tasks at the congested ITQ(s), the MTM light and complex processing scheduler 154-1 intelligently discards tasks during enqueue processing for MTM data queues. In this manner, statistics may be maintained regarding the number of tasks, or packets, dropped, a data size of the packets dropped, total data size of all packets dropped, or the like. Importantly, it should be noted that if discarding were to be performed at the ITQs (e.g., simply discarding new tasks once an ITQ is full), then no statistics about the dropped tasks/packets would be maintained, which would not be desirable.

FIG. 10 illustrates one embodiment of a flow control scheduler 165 of the MTM engine that includes the MTM light and complex processing scheduler 154-1 and the MTM output shapers 154-2 and 154-3 of FIG. 9 according to one embodiment of the present disclosure. In general, the flow control scheduler 165 of the MTM engine implements output shaping and arbitration scheduling. The flow control scheduler 165 includes a root scheduler (0) that allows multiple diverse level 1 schedulers (1a, 1b, 1d, and 1e) to coexist. Note that FIG. 10 is an abstracted view of the flow control scheduler 165 and, as such, not all level 1 schedulers are illustrated. A scheduling bandwidth of the root scheduler (0) is shared between the level 1 schedulers (1a, 1b, 1e, and 1d). The scheduler 1a performs arbitration scheduling, and the other level 1 schedulers perform output shaping. As illustrated, the level 1 schedulers provide flow control (e.g., stop the flow on outgoing tasks) in response to backpressure from corresponding ITQs, as discussed above with respect to FIG. 9.

As illustrated, tasks that have been identified by the MPP light input classification function 152-1 (FIG. 9) as needing complex processing form a number of unshaped flows that are input into a number of MTM queues 166. A scheduler 2a, which is a Shaped Deficit Weighted Round Robin (SDWRR) scheduler, passes the input tasks from the MTM queues 166 to the scheduler 1a according to predefined weights ($W_{a1}$ through $W_{a3}$). The weights ($W_{a1}$ through $W_{a3}$) represent relative bandwidth, which is a different paradigm than ITQ schedulers which schedule based on number of packets while disregarding the sizes of the packets. The weights ($W_{a1}$ through $W_{a3}$) can be selected based on maximum bandwidths expected for each of the corresponding flows. In this way, if one of the flows is consuming too much bandwidth, that flow has the highest probability of congesting and ultimately discarding. Note that while three MTM queues 166 are illustrated in this example, the number of MTM queues 166 may vary depending on the particular implementation. The number of MTM queues 166 can be selected to have as little or as much flow granularity as desired. A single MTM queue 166 can be used to group multiple flows with similar behaviors or separate MTM queues 166 can be used for each micro-flow. However, if too many MTM queues 166 are used, calculating appropriate bandwidths may become difficult.

In a similar manner, tasks that have been identified by the MPP light input classification function 152-1 as needing light processing form a number of unshaped flows that are input to a number of MTM queues 168. A scheduler 2c, which is a SDWRR scheduler, passes the input tasks from the MTM queues 168 to the scheduler 1a according to predefined weights ($W_{c1}$ through $W_{c3}$). The weights ($W_{c1}$ through $W_{c3}$) represent relative bandwidth. The weights ($W_{c1}$ through $W_{c3}$) can be selected based on maximum bandwidths expected for each of the corresponding flows. In this way, if one of the flows is consuming too much bandwidth, that flow has the highest probability of congesting and ultimately discarding. Note that while three MTM queues 168 are illustrated in this example, the number of MTM queues 168 may vary depending on the particular implementation. The number of MTM queues 168 can be selected to have as little or as much flow granularity as desired. A single MTM queue 168 can be used to group multiple flows with similar behaviors or separate MTM queues 168 can be used for each micro-flow. However, if too many MTM queues 168 are used, calculating appropriate bandwidths may become difficult.

Input tasks that have been processed and identified for IP-to-BCN deconcatenation form a shaped flow that is input to an MTM queue 170. The input tasks are passed from the MTM queue 170 through a rate shaping function 172 to a level 2 scheduler 2b. It should be noted that the rate shaping function 172 is needed as a result of an exposed flaw in the way that the MPP engine operates. Specifically, IP-to-BCN deconcatenation has exposed an MPP Prequeue Modifier (PQM) memory exhaustion errata. Therefore, the IP-to-BCN deconcatenation flows will experience an extra scheduling/shaping phase in the middle of their complex processing. Specifically, the overall flow for these packets will be: light input classification, MTM scheduling, first portion of complex processing, MTM BCN rate shaping, remainder of complex processing, and finally MTM output shaping. The shaped rate output of the rate shaping function 172 is preferably higher than will ever be observed in a real network, but the rate shaping function 172 prevents the possibility of significant performance degradation due to the MPP PQM memory exhaustion errata. The rate shaping function 172 is not technically part of the input queuing and scheduling phase provided by the MTM engine because the corresponding flows are already input queued prior to final phase of classification and header checks. For this reason, the tasks output by the rate shaping function 172 enter a different MPP queue (i.e., MPP ITQ 2) than the rest of the tasks output by the scheduler 1a (i.e., MPP ITQ 1).

The scheduler 1a is a SDWRR scheduler that then passes the input tasks from the level 2 schedulers 2a, 2b, and 2c to the root scheduler (0) according to predefined weights, which in this example are 0.25, 0.25, and 0.5 for the level 2 schedulers 2a, 2b, and 2c, respectively. The weights 0.25, 0.25, and 0.5 represent relative bandwidth. Note that the weights used by the scheduler 1a are only examples and may be varied as desired for the particular application. The values of 0.25, 0.25, and 0.5 were selected for the example to provide a good mixture between three classes of flows (i.e., complex processing, BCN shaping, and light processing) while giving a bias to traffic which is easy to process and will therefore clear out of the NPU 48 faster when scheduled. The weights influence the latency of packets when there is an overload of the NPU resources, which results from the MTM queues 166, 168, and 170 being backpressured by the NPU engines.

In general, the MTM queues 166, 168, and 170 associated with the scheduler 1a are not directly backpressured. Rather, the scheduler 1a is the backpressure point for the ITQs of all of the downstream NPU engines. Thus, when the scheduler 1a is slowed down or stopped in response to backpressure, then all of the MTM queues 166, 168, and 170 associated with the scheduler 1a will receive less bandwidth.

As illustrated in FIG. 10, backpressure from an output queue is provided to one of the MTM queues 168. This backpressure is optional. For example, one of the MTM queues (the MTM queue 168 in this example) may be a dominant source of data for one of the output ports (e.g., the EIOA B/H port). When data leaves this MTM queue, it is processed by the MPP engine and other NPU engines, but, when the data arrives at the output port, the data causes congestion. In this case, it may be valuable to isolate the traffic sourced from the specific MTM queue into EIOA ITQ and provide a backpressure patch back to the MTM queue sourcing most of the data. If this option is not implemented, the backpressure for the output port may be provided to the scheduler 1a.

In response to backpressure from the output queue received at the MTM queue 168, the corresponding MTM queue 168 will not be able to use its allotted weight $W_{c3}$ of the bandwidth of the scheduler 2c. In this case, the weight $W_{c3}$ is partitioned between the remaining two MTM queues 168 associated with the scheduler 2c. Once backpressure is removed, the MTM queue 168 is again allowed to use its allotted weight $W_{c3}$. In this way, the effect of the backpressure directed to the MTM queue 168 is to decrease the configured share of the scheduler bandwidth of the MTM queue 168 being backpressured. Note that all of the SDWRR schedulers are preferably "work conserving," which means children schedulers or MTM queues that do not have tasks to be scheduled for processing will give up their allotted share of the scheduler bandwidth to their sibling schedulers that to have tasks to be scheduled for processing. An alternative to implementing backpressure from the output queue to the MTM queue 168 is requeuing the data after the NPU processing is complete and implementing an output scheduler/shaper directly interfacing to the output port. In this way, the congestion at the output port has a more direct backpressure method allowing intelligent discard and statistics collection but the scheduler 1a does not need to be involved.

Unlike the scheduler 1a (i.e., the arbitration scheduler), the schedulers 1b, 1d, and 1e (i.e., the output shapers) are not generally associated with a large number of flows. As such, in FIG. 10, the schedulers 1b, 1d, and 1e are illustrated as having simple hierarchies of one or two shaped flows per level 1 scheduler. More specifically, shaped flows leaving the NPU 48 are input into an MTM queue 173 associated with the scheduler 1b, MTM queues 174 associated with the scheduler 1e, and MTM queues 175 associated with the scheduler 1d. Rate shaping is performed by rate shaping functions 176. The backpressure from a specific ITQ of the NCA engine or the EIOA LITR engine are also shown. The rate shaping functions 176 are HDLC shapers (i.e., shapers that control HDLC link packet rate) and cannot receive flow control on a per queue basis because the HDLC controller (i.e., the control module 78 of FIG. 6) is part of the radio unit interface 38 (which is preferably implemented as a Field Programmable Gate Array (FPGA)) and is therefore across the SGMII interface 74. As such, the precise rate of the HDLC controller is not observable at the NPU 48. In this case, the EIOA engine can provide flow control if the whole bandwidth of the SGMII interface 74 is exceeded, but the rate shaping functions 176 alone are responsible for ensuring that the HDLC controller rate is not exceeded without flow control.

FIG. 11 illustrates one embodiment of an input processing scheduler 177 of the MPP engine according to one embodiment of the present disclosure. As illustrated, the input processing scheduler 177 of the MPP engine includes ITQs 178 through 184 and a Weighted Round Robin (WRR) scheduler 186. As illustrated, the ITQs 178 through 184 provide flow control, or backpressure, to the scheduler 1a of the flow control scheduler 165 of the MTM engine. The WRR scheduler 186 schedules input tasks in the ITQs 178 through 184 for processing by the MPP engine according to weights $W_{ML}$ (medium low), $W_{MED}$ (medium), $W_{MED}$ (medium), and $W_{VH}$ (medium high), respectively. As an example, $W_{VH}$ may be set to 0.73, $W_{MED}$ may be set to 0.1, and $W_{ML}$ may be set to 0.07. Note, however, that these weighting values as well as the relative weightings of the ITQs 178 through 184 may vary depending on the particular implementation. Under normal operation, the weights will have no effect because the MPP engine is relatively lightly loaded and, therefore, the ITQs 178 through 184 are normally close to empty.

FIG. 12 illustrates one embodiment of an input processing scheduler 188 of an NPU engine according to one embodiment of the present disclosure. In this embodiment, the NPU engine is any one of the SPP engine, the PIC engine, the PAB engine, and the SED engine. As illustrated, the input processing scheduler 188 includes ITQs 190 and 192 and a WRR scheduler 194. As with the MPP engine, flows, or tasks, may pass through other NPU engines before reaching the input processing scheduler 188 of the NPU engine. As illustrated, the ITQs 190 and 192 provide flow control, or backpressure, to the scheduler 1a of the flow control scheduler 165 of the MTM engine. The WRR scheduler 194 schedules input tasks in the ITQs 190 and 192 for processing by the NPU engine according to weights $W_{MED}$ (medium) and $W_{VH}$ (medium high), respectively. The values for the weights will vary depending on the particular application; however, as one example, $W_{MED}$ may be 0.27 and $W_{VH}$ may be 0.73. In one embodiment, the tasks from the ITQ 192 are always selected by the WRR scheduler 194 if the tasks have passed through the MPP engine since visiting the MTM input queuing phase. Thus, if a flow enters the MPP engine for second or subsequent processing, the MTM scheduler gives the flow higher priority. This is also the reason that, in MPP ITQ assignment, the re-entering flow is assigned to an ITQ that is different than flows entering processing for the first time.

FIG. 13 illustrates one embodiment of an input processing scheduler 196 of the EIOA engine of the NPU 48 according to one embodiment of the present disclosure. As illustrated, the input processing scheduler 196 includes an ITQ 198 associated with N/A scheduler 200 and ITQs 202 and 204 associated with a Round Robin (RR) scheduler 205. The N/A scheduler 200 is shown to indicate that no scheduling strategy is needed since there is only one flow coming into the N/A scheduler 200 (i.e., the N/A scheduler 200 is full service to the single flow). The RR scheduler 205 is a RR scheduler because the weights for the paths from the ITQs 202 and 204 are equal. However, the weights may alternatively be unequal in which case the RR scheduler 205 may alternatively be a WRR scheduler. Flows, or tasks, may pass through other NPU engines before reaching the input processing scheduler 196 of the EIOA engine. As illustrated, the ITQs 198, 202, and optionally 204 provide flow control, or backpressure, to the scheduler 1c, the scheduler 1e, and optionally the MPP engine. The EIOA input processing scheduler schedules tasks for processing by the EIOA engine.

FIG. 13 also illustrates an abstracted view of the flow control scheduler 165 of the MTM engine. This abstracted view shows the scheduler 1e as shown in FIG. 10 as well as scheduler 1c, which is not shown in FIG. 10. The scheduler 1c is fed by corresponding ITQs 206 and rate shapers 207 and corresponding level 2 schedulers (2x, 2y, and 2z).

Now, the discussion will turn to a discard architecture of the multi-core processor 34 according to various embodiments of the present disclosure. In general, there are two discard architectures implemented within the datapath: NPU discards in the MTM engine and CPU discards in software executed by the processor cores 40. In general, the processor cores 40 will not be required to discard packets unless there is a problem with the hardware, but the processor cores 40 are responsible for ensuring transmission is lossless and therefore adhering to hardware limitations. This software needs to be made aware of hardware congestion. In both discard architectures, the MTM engine, and in particular Compute Engines (CEs) of the MTM engine, have a role to play, either discarding data or communicating congestion to the processor cores 40. Table 1 below enumerates all of the MTM queues and whether their CE scripts should be participating in MTM discards or CPU discards.

TABLE 1

| Discard Architecture | Source of Data | Destination of Data | Discard Point | MTM Queue Involved |
|---|---|---|---|---|
| CPU Discard | CM | HDLC 0/1 CEEM 1 (via LITR) | CM | 0x0 |
| CPU Discard | CM | HDLC 2/3 CEEM2 (via LITR) | CM | 0x1 |
| CPU Discard | CM | HDLC 4/5 CEEM3 (via LITR) | CM | 0x2 |
| CPU Discard | CM | HDLC 6 (Radio) | CM | 0x3 |
| CPU Discard | CM | HDLC 7 (Radio) | CM | 0x4 |
| CPU Discard | CM | HDLC 8 (Radio) | CM | 0x5 |
| CPU Discard | CM | HDLC 9 (Radio) | CM | 0x6 |
| CPU Discard | CM | HDLC a (Radio) | CM | 0x7 |
| CPU Discard | CM | HDLC b (Radio) | CM | 0x8 |
| MTM Discard | IPB/H | HDLC 0/1 | MTM | 0x50 |
| MTM Discard | IPB/H | HDLC 2/3 | MTM | 0x51 |
| MTM Discard | IPB/H | HDLC 4/5 | MTM | 0x52 |
| MTM Discard | IPB/H | HDLC 6 | MTM | 0x53 |
| MTM Discard | IPB/H | HDLC 7 | MTM | 0x54 |
| MTM Discard | IPB/H | HDLC 8 | MTM | 0x55 |
| MTM Discard | IPB/H | HDLC 9 | MTM | 0x56 |
| MTM Discard | IPB/H | HDLC a | MTM | 0x57 |
| MTM Discard | IPB/H | HDLC b | MTM | 0x58 |
| MTM Discard | Data Path | CM Core | MTM | 0x10 |
| MTM Discard | Data Path | CM Core | MTM | 0x1a |
| MTM Discard | NPU | CM Core | MTM | 0x11 |
| MTM Discard | NPU | CM Core | MTM | 0x12 |
| MTM Discard | B/H | VSC (i.e., BSC) | MTM | 0x13 |
| MTM Discard | B/H | DO SC | MTM | 0x14 |
| CPU Discard | DO SC | CM | DO SC | 0x15 |
| CPU Discard | VSC | CM | VSC | 0x16 |
| CPU Discard | CM | VMP | CM | 0x17 |
| CPU Discard | CM | DO SC | CM | 0x18 |
| CPU Discard | CM | NPU | CM | 0x20 |
| MTM Discard | LITR | NPU | MTM | 0x21 |
| MTM Discard | IPB/H | NPU | MTM | 0x22 |
| CPU Discard | VSC | NPU | VSC | 0x23 |
| MTM Discard | IPB/H | NPU | MTM | 0x30 |
| CPU Discard | CM | IPB/H | CM | 0x40 |
| CPU Discard | DO SC | CM | DO SC | 0x41 |
| CPU Discard | DO SC | IPB/H | DO SC | 0x42 |

By design the MTM data queues should be the only discard point in the NPU 48. Under exceptional conditions, an ITQ discard may occur, which breaks this rule. The ITQ discard exceptions are discussed below. MTM queues which discard typically receive traffic from ports which cannot be flow controlled, such as HDLC ports via the radio unit interface 38 or the backhaul port. Local software on a processor core 40 should be the only discard point when data is sourced from a processor core 40. In these cases, the processor core 40 monitors backpressure and ensure hardware resources are not exhausted. In this case, software may have to discard within the processor core 40 if something is wrong on CPU transmit or CPU-to-CPU transfers.

Regarding MTM discards, discards should not occur in ITQs as most ITQs assert backpressure to the MTM engine. The notable exceptions are the B/H and D/C EIOA ports for data flows which have never been scheduled by the MTM engine and, therefore, flow control would be ineffective. If discards in the ITQs are observed during testing, then packets destined to those ITQs may be discarded in the MPP engine based on flow control from designated EIOA queues.

Discards are preferably counted based on packets and bytes by a Traffic Manager (TM) engine of the MTM engine. These discard counts can be used by software to determine which flows are not behaving predictably. In a well behaved system, there should be enough NPU performance to avoid discards. So, any discards are a sign of a problem either in the NPU 48, in the system, or in the network.

Discard count thresholds can be configured by software such that the CM processor core (i.e., the processor core 40-3) can be interrupted when the discard counts are excessive. Note that while the CM processor core is interrupted in this embodiment, any processor core may be interrupted. Interrupts from the MTM engine to the CM processor core are not directly part of the ACP architecture. As such, an interrupt packet mechanism is preferably implemented as described below.

The interrupt packet mechanism for the MTM engine to interrupt the CM processor core have five phases, namely, creation of the interrupt packet, arming the interrupt mechanism, putting an interrupt packet in an MTM queue, releasing of the interrupt packet (interrupting), and collection of statistics. If software wishes to poll queue parameters to collect statistics instead of implementing an interrupt mechanism, then this interrupt packet mechanism does not need to be armed and none of the steps in this procedure are necessary.

As illustrated in FIG. 14, in the first phase, an interrupt packet is created by software in the processor core 40-3 of the CM (i.e., the CM processor core), which is referenced in FIG. 14 as CPU. The format of this packet can be defined by software as the source and destination of the packet is software. A datapath virtual pipeline defined for CPU to MTM to CPU is used for the interrupt packet mechanism. The interrupt packets are inserted into this virtual pipeline.

A first copy of the interrupt packet, referred to herein as an arming packet, is sent to the MTM engine when software is ready to enable the interrupt packet mechanism. The arming packet is directed to an interrupt queue 208 of the NCA engine. The NCA engine operates as the interface between the processor cores 40 and the NPU. From the NCA engine, the arming packet is sent to an interrupt packet queue 210 in the MTM engine via a no discard ITQ 212. A TM script 214 for buffer management of the interrupt packet queue 210 includes logic for turning on backpressure to the interrupt packet queue 210. This turning on of backpressure is not conditional. The TM script 214 is running on Compute Engine (CE) 216. All arriving packets to the interrupt packet queue 210 trigger this backpressure. The arming packet could alternatively be enqueued to the interrupt packet queue 210, but the backpressure will not be enabled fast enough to hold the packet in the interrupt packet queue 210 in all cases. Therefore, it is preferable for the TM script 214 to instead discard this arming packet.

After waiting a small amount of time to ensure that backpressure has stalled the interrupt packet queue 210, software can send a second copy of the interrupt packet to the interrupt packet queue 210. This second copy will not be discarded by the TM script 214 as it will be used as an interrupt packet. The interrupt packet will be stuck in the interrupt packet queue 210 because of the backpressure triggered by the arming packet. Of course, the TM script 214 does not need to implement a threshold based discard mechanism because there is only one interrupt packet in the system at a time. It might be useful to discard any interrupt packets received when there is already an interrupt packet in the interrupt packet queue 210, which allows more options in software implementation. The TM script 214 only has the job of triggering the backpressure. The interrupt packet is provided to the CM core in response to backpressure to thereby provide a packet-based interrupt.

More specifically, as illustrated in FIG. 15, when data packets arrive to regular ITQs 220 of the MTM engine and are passed to MTM queues 222, TM scripts 224 associated with the MTM queues 222 will run an algorithm to check the MTM queue fill, which is one of a number of queue parameters 226 stored in a MTM queues namespace, and discard the packet if the MTM queues 222 are above the software configured discard threshold. If the MTM queue 222 is not full (MTM queue fill is less than threshold), then the packet will be en-queued. When discarding, the TM script 214 will increment discarded packet and byte counters. If the counters exceed software configured statistics event thresholds, then an interrupt will need to be generated to software. This is the fourth phase. The TM script 214 will deassert the flow control to the interrupt packet queue 210 in order to release the interrupt packet. This is a conditional operation in TM script of a user data queue of the MTM engine, as an interrupt packet should only be sent to alert software if one of the software configured conditions is being encountered.

The interrupt packet is carried by its task descriptor to the NCA queue 218 specifically for interrupt packets to the CM processor core. Software will retrieve the packet and identify it as the interrupt packet for MTM statistics collection. It is possible to use global parameters to store some information about the types of thresholds which have been exceeded, but the global parameters cannot reliably store a list of queues needing attention. Therefore, the interrupt packet preferably does not include any information about the user data queue which triggered the interrupt. When receiving the interrupt packet, software will have to poll all of the MTM queues to collect statistics. This is the fifth phase. TM/Traffic Shaper (TS) scripts should also maintain the state of the interrupt packet queue 210 (i.e., number of packets enqueued, backpressure state) and the states of the user queues 222 (interrupt triggered). This information will allow software to monitor and audit the system for correct operation and will assist software in finding the queues which need attention after an interrupt. Note that TM scripts allow buffer management policies to be programmed by the TM compute engine. The TS scripts enable configurable scheduling structures and algorithms using the TS compute engine.

With regard to the interrupt packet mechanism, some firmware features (TM script running on user data queues) include:
  Software configurable discard threshold;
  Rolling counters of bytes discarded and packets discarded;
  Software configurable stats roll-over level (e.g., interrupt on first discard, interrupt every X discards where X is a power of 2, and/or interrupt at counter roll-over;
  Counter roll-over flags (bytes and packets); and
  Interrupt was asserted flag.
Software Features for discard stats collection include:
  Poll all queue parameters discard counters, roll-over flags, and interrupt asserted flags on interrupt
  Implement running counters in software. Notably, queue parameter counters are just least significant bits of full counter. Queue parameter counters never clear because of lack of atomic instructions available to software.
  Configure discard thresholds, roll-over level.
  Clear interrupt asserted flags in queue parameters.

In alternate implementations, more interrupt packet queues could be implemented such that an interrupt packet represents a smaller number of data queues (e.g., one-for-one in the extreme case). However, in the embodiments above, a single global interrupt packet/queue for all MTM statistics events is used. This pushes the burden of collecting stats to software. The alternative implementations would avoid software polling to see what the source of the interrupt was, but at the cost of many more interrupt packets enabled.

Next, a discussion of an embodiment where backpressure to the CM processor core with CPU discards is provided. In some implementations, the CM software expects to implement lossless transmission of data by only inserting packets destined to HDLC ports at the rate which is accepted at the HDLC port. In order to implement this feature, the CM software sends data to a hardware queue and monitors the depth of the hardware queue until there is room to add more data. In this way, the CM software is implementing its own flow control to ensure that the latency of the base station 16 is low and discards are rare or non-existent. If discards are necessary, the CM software will discard excess data which does not fit on the HDLC port.

Ideally, the CM processor would just read queue depth in the MTM queues to implement flow control. However, it is assumed that reading backpressure ring state will require less system overhead than reading the queue parameters NameSpace to determine queue depth. In either case, TM/TS scripts can be written to track queue depth. The backpressure flags can be used as an additional indicator of queue depth relative to the software configured congestion threshold. So the CM core can monitor the backpressure flags in order to know if the MTM queues are congested. For queues with this type of discard model, the MTM engine should never discard as the congestion threshold will result in software not sending any more data to the MTM queue. From the software perspective, this is a congestion monitoring feature, but the system level behavior is backpressure from MTM queues to the software-based queuing system. However, the hardware mechanism makes hardware queue congestion of MTM queues visible to the software. Software can implement the complementary algorithm for queue monitoring.

In the NPU architecture, an HDLC rate shaper is implemented in the MTM engine in association with the MTM queue for which backpressure is provided to the software queuing system. FIG. 16 illustrates an architecture for maintaining the queue depth and congestion information for software to read according to one embodiment of the present disclosure. TM and TS scripts 228 and 230 of the MTM engine are capable of setting up to 32 backpressure flags on a backpressure ring 232 of the NPU 48. These flags can be used to create software visibility of queue congestion of up to 32 queues. The TM/TS scripts 228 and 230 manage the backpressure flags by comparing, for each MTM queue 234, current queue depth to a software configured threshold, which is one of a number of queue parameters 236 stored in the MTM queues namespace. Either method (i.e., flags on the backpressure ring 232 or queue depth in queue parameters) would work for this feature. However, because there are less than 32 queues which require backpressure to software queuing, the backpressure ring flags are preferably used.

Software configures a congestion threshold and a backpressure ring code point in the queue parameters 236 for the MTM queues 234 associated with this feature. This list of queues can be extracted from Table 1 where the first column says "CPU Discard." If the queue fill exceeds the congestion threshold during enqueue operations in the TM script 228, the backpressure ring flag corresponding to the code point will be set. If the queue fill falls below the threshold during dequeue operations, the TS script 230 will clear the backpressure flag. CPU discard queue types do not require a discard threshold, so this architecture may use a different TM script than the MTM discard type.

The CM processor core can read the backpressure flags to determine if there is congestion in the queues. Typically, the CM processor core would read the backpressure flag before sending data to a queue. Then, the CM processor core can safely send a burst of data to the queue before checking the backpressure flag again.

The following acronyms are used throughout this disclosure.

3GPP2 3$^{rd}$ Generation Partnership Project 2
ACN Application Communication Network
ACP Axxia® Communication Processor
AMP Asymmetric Multi-Processing
ASIC Application Specific Integrated Circuit
BCN Base Station Communication Network
B/H Backhaul
BS Base Station
BSC Base Station Controller
CDMA Code Division Multiple Access
CE Compute Engine
CM Control Module
CPRI Common Packet Radio Interface
CPU Central Processing Unit
DA Destination Address
D/C Daisy-Chain
DO Data Only or Data Optimized
DO MP Data Only Modem Processor
DO SC Data Only System Controller
EIOA Ethernet Input/Output Adaptor
EV-DO Evolution-Data Optimized
FPGA Field Programmable Gate Array
GPS Global Positioning System
HDLC High-level Data Link Communication
HSSL High Speed Serial Link
IP Internet Protocol
ITQ Input Task Queue
L2 Layer 2
LITR Layer 1 Transmitter and Receiver
LTE Long Term Evolution
MAC Media Access Control
MPP Modular Packet Processor
MS Multiple-Standard
MTM Modular Traffic Manager
NCA Nuevo CPU Adaptor
NPU Network Processing Unit
OAM Operations, Administration, and Maintenance
PAB Packet Assembly Block
PCIE Peripheral Component Interconnect Express
PIC Packet Integrity Check
PQM Modular Packet Processor Prequeue Modifier
QoS Quality of Service
RAT Radio Access Technology
RNC Radio Network Controller
RR Round Robin
RTC Real-Time Clock
RTT Radio Transmission Technology
SDWRR Shaped Deficit Weighted Round Robin
SED Stream Editor
SGMII Serial Gigabit Media Independent Interface
SMP Symmetric Multi-Processing
SPP Security Protocol Processor
TM Traffic Manager
TS Traffic Shaper
UDP User Datagram Protocol
Voice MP Voice Modem Processor
WRR Weighted Round Robin Those skilled in the art will recognize improvements and modifications to the preferred embodiments of the present disclosure. All such improvements and modifications are considered within the scope of the concepts disclosed herein and the claims that follow.

What is claimed is:

1. An apparatus for use in an advanced digital baseband processor for a base station in a cellular communications network, the base station comprising the advanced digital baseband processor and one or more radio units connected to the advanced digital baseband processor, the apparatus comprising:
 a multi-core processor comprising a plurality of processor cores, wherein at least a subset of the plurality of processor cores supports a plurality of radio access technologies by performing a plurality of processes comprising:
  processing of signals sent from the multi-core processor to one or more modems connected to the multi-core processor; and
  processing of signals received by the multi-core processor from the one or more modems connected to the multi-core processor,
  wherein the multi-core processor is configured in an asymmetric multiprocessing mode in which each radio access technology of the plurality of radio access technologies is supported by a different one of the at least a subset of the plurality of processor cores.

2. The apparatus of claim 1 wherein the plurality of radio access technologies comprise:
 a CDMA voice radio access technology; and
 a CDMA data only radio access technology.

3. The apparatus of claim 2 wherein the plurality of radio access technologies further include LTE.

4. The apparatus of claim 2 wherein the CDMA voice radio access technology and the CDMA data only radio access technology are supported by different cores of the plurality of processor cores of the multi-core processor.

5. The apparatus of claim 1 wherein the multi-core processor further comprises a shared network connectivity resource that provides connectivity to a backhaul network of the cellular communications network for the multi-core processor.

6. The apparatus of claim 1 wherein the apparatus comprising the multi-core processor is integrated into the advanced digital baseband processor, and the advanced digital baseband processor further comprises:
 one or more shared resources utilized by the at least a subset of the plurality of processor cores that support the plurality of radio access technologies.

7. The apparatus of claim 6 wherein the one or more shared resources comprise one or more shared physical resources selected from a group consisting of: memory, a power supply, a synchronization component, a battery pack, a real-time clock, and a fan.

8. The apparatus of claim 6 wherein the one or more shared resources comprise one or more shared baseband transport resources for transporting baseband signals between the advanced digital baseband processor and the one or more radio units of the base station.

9. The apparatus of claim 1 wherein the multi-core processor comprises a single Operations, Administration, and Maintenance architecture for all of the plurality of radio access technologies.

10. The apparatus of claim 9 wherein one of the plurality of processor cores of the multi-core processor is dedicated for Operations, Administration, and Maintenance.

11. The apparatus of claim 1 wherein the multi-core processor is configured in an asymmetric multiprocessing mode in which each radio access technology of the plurality of radio access technologies is supported by a different one of the at least a subset of the plurality of processor cores, and the multi-core processor further comprises:
- a physical interface configured to communicatively couple the multi-core processor to a backhaul network of the cellular communications network; and
- a network processing unit configured to provide packet routing for backhaul communications over the backhaul network and inter-core communication between the plurality of processor cores of the multi-core processor.

12. The apparatus of claim 11 wherein the network processing unit is configured to:
- perform light input classification to determine whether incoming packets received by the network processing unit require light or complex processing;
- perform light processing of the incoming packets requiring light processing; and
- perform complex processing of the incoming packets requiring complex processing.

13. The apparatus of claim 12 wherein, in order to perform the light input classification, the network processing unit is further configured to, for each incoming packet:
- determine whether a destination MAC address of the incoming packet matches a MAC address of the base station;
- determine that the incoming packet requires complex processing if the destination MAC address matches the MAC address of the base station; and
- determine that the incoming packet requires light processing if the destination MAC address is a MAC address associated with a daisy-chain port of the advanced digital baseband processor.

14. The apparatus of claim 11 wherein the network processing unit is further configured to provide flow control.

15. The apparatus of claim 11 wherein the network processing unit comprises:
- a scheduler that schedules incoming packets for processing by forwarding corresponding tasks to input task queues of appropriate engines of the network processing unit;
- wherein, in order to provide flow control, the scheduler is configured to:
  - receive backpressure from the input task queues of the engines when the input task queues reach a predefined backpressure threshold; and
  - in response to receiving the backpressure:
    - discard incoming packets; and
    - record statistics regarding the incoming packets that are discarded.

16. The apparatus of claim 15 wherein the network processing unit is further configured to provide an interrupt mechanism in response to the scheduler discarding an incoming packet in response to receiving the backpressure, and, in order to provide the interrupt mechanism, the network processing unit comprises:
- an interrupt queue configured to store an interrupt packet;
- wherein the scheduler is configured to send the interrupt packet from the interrupt queue to one of the plurality of processor cores of the multi-core processor in response to discarding the incoming packet.

17. The apparatus of claim 11 wherein the network processing unit comprises:
- a scheduler that schedules incoming packets for processing by forwarding corresponding tasks to input task queues of appropriate engines of the network processing unit;
- wherein, in order to provide flow control, the scheduler is configured to:
  - receive backpressure from the input task queues of the engines when the input task queues reach a predefined backpressure threshold; and
  - in response to receiving the backpressure, stop flow of tasks to one or more downstream engines.

18. The apparatus of claim 1 wherein each of the plurality of radio access technologies is implemented by two or more separate functions, and each function of each one of the radio access technologies is supported by a different one of the plurality of processor cores.

* * * * *